(12) United States Patent
Burckhardt et al.

(10) Patent No.: US 9,011,630 B2
(45) Date of Patent: *Apr. 21, 2015

(54) HOT CURING OR HEAT-ACTIVATED COMPOSITION CONTAINING A SURFACE-DEACTIVATED POLYISOCYANATE

(75) Inventors: Urs Burckhardt, Unterengstringen (CH); Peter Gimmnich, Constance (DE)

(73) Assignee: Sika Technologies AG, Baar (CH)

( * ) Notice: Subject to any disclaimer, the term of this patent is extended or adjusted under 35 U.S.C. 154(b) by 595 days.

This patent is subject to a terminal disclaimer.

(21) Appl. No.: 13/259,870

(22) PCT Filed: Mar. 31, 2010

(86) PCT No.: PCT/EP2010/054263
§ 371 (c)(1),
(2), (4) Date: Oct. 4, 2011

(87) PCT Pub. No.: WO2010/112536
PCT Pub. Date: Oct. 7, 2010

(65) Prior Publication Data
US 2012/0012251 A1    Jan. 19, 2012

(30) Foreign Application Priority Data

Mar. 31, 2009  (EP) .................................. 09156889

(51) Int. Cl.
| | | |
|---|---|---|
| *C09J 175/04* | (2006.01) | |
| *C08G 18/12* | (2006.01) | |
| *C08G 18/10* | (2006.01) | |
| *C08G 18/48* | (2006.01) | |
| *C08G 18/50* | (2006.01) | |
| *C08G 18/79* | (2006.01) | |
| *C08G 18/80* | (2006.01) | |

(52) U.S. Cl.
CPC ............ *C08G 18/4866* (2013.01); *C08G 18/10* (2013.01); *C08G 18/12* (2013.01); *C08G 18/4829* (2013.01); *C08G 18/503* (2013.01); *C08G 18/798* (2013.01); *C08G 18/8038* (2013.01); *C08G 2170/20* (2013.01); *C09J 175/04* (2013.01)

(58) Field of Classification Search
CPC ...... C08G 18/80; C08L 75/00; C09D 175/04; C09J 175/00

USPC ........................... 156/331.7; 525/457; 528/45
See application file for complete search history.

(56) References Cited

U.S. PATENT DOCUMENTS

| | | |
|---|---|---|
| 4,400,497 A | 8/1983 | Blum et al. |
| 4,525,570 A | 6/1985 | Blum et al. |
| 4,595,445 A | 6/1986 | Hombach et al. |
| 6,017,432 A | 1/2000 | Boyd et al. |
| 6,926,949 B1 | 8/2005 | Hälg et al. |
| 2002/0193534 A1* | 12/2002 | Abend ........................... 525/452 |
| 2007/0148445 A1* | 6/2007 | Licht et al. .............. 428/355 EP |

FOREIGN PATENT DOCUMENTS

| | | |
|---|---|---|
| EP | 0 062 780 A1 | 10/1982 |
| EP | 0 100 508 A2 | 2/1984 |
| EP | 0 153 579 A2 | 9/1985 |
| WO | WO 94/18255 | 8/1994 |
| WO | WO 99/01493 | 1/1999 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Mar. 31, 2010, in the corresponding International Application No. PCT/EP2010/054263.
DIN 53504, Oct. 2009, pp. 1-19.
International Search Report (PCT/ISA/210) issued on Jul. 6, 2010, by European Patent Office as the International Searching Authority for International Application No. PCT/EP2010/054263.
Written Opinion (PCT/ISA/237) issued on Jul. 6, 2010, by European Patent Office as the International Searching Authority for International Application No. PCT/EP2010/054263.

* cited by examiner

*Primary Examiner* — Michael N Orlando
(74) *Attorney, Agent, or Firm* — Buchanan Ingersoll & Rooney PC

(57) ABSTRACT

The present invention relates to curable compositions comprising at least one specific blocked amine, at least one surface-deactivated polyisocyanate that is solid at ambient temperature and optionally water or a water-producing substance. Compositions of this type are characterized by an extremely high storage stability as long as they are not heated. Hot curing compositions that cure with the action of heat can thus be produced. Heat-activated compositions can also be produced. When heat is applied the latter compositions are not cured but are activated so that they are able to cure under the influence of moisture. The curable compositions are particularly suitable for use as adhesives.

31 Claims, No Drawings

HOT CURING OR HEAT-ACTIVATED COMPOSITION CONTAINING A SURFACE-DEACTIVATED POLYISOCYANATE

TECHNICAL FIELD

The invention relates to the field of curable polyurethane compositions and the use thereof as hot curing adhesive and heat-activatable adhesive, sealant and coating.

STATE OF THE ART

One-component moisture-reactive polyurethane composition with free isocyanate groups have been used as adhesives, sealants and coating materials for a long time. Such systems are easy to use since mixing operations are not required and open times are long. However, they cure slowly since the moisture required for curing has to penetrate the material from the air by diffusion processes which increasingly slow down during progression of curing towards the interior. Moreover, their shelf life is limited.

Systems that on the one hand have a sufficiently long open time ensuring an exact and secure processing and on the other hand cure very fast to become loadable or processable only a short time after application, e.g., to allow parts assembled with an adhesive to be moved or fixing devices to be removed, are desired for certain applications. High curing speeds in combination with long open times may in particular be achieved with hot curing polyurethane compositions, so-called hot cures.

Hot curing polyurethane compositions wherein the isocyanate groups are chemically blocked using, e.g., phenols, oximes or lactams as blocking agents, have been known for a long time. In particular, these systems are detrimental in that the blocking agents released during curing result in the formation of toxic vapors and annoying odors which can be disadvantageous in particular when using the compositions indoors.

Hot curing polyurethane compositions that contain finely divided solid isocyanates surface-deactivated by treatment with amines are known from EP 0 062 780 A1 and EP 0 100 508 A2. In these compositions the surface-deactivated isocyanates mainly exist in combination with polyols. These systems are resistant to storage at room temperature and cure at temperatures ranging from 70° C. to 180° C. without releasing volatile substances. However, either comparatively high temperatures or very active catalysts must be used in order to achieve rapid curing since the reaction of hydroxyl groups with isocyanate groups tends to be slow. Moreover, there is the risk of blistering during curing, in particular, if some time elapses between application and curing, since the composition can take up moisture from the environment and $CO_2$ is formed by the reaction of isocyanates and water.

Similar systems wherein polyols are at least partially replaced by polyamines are known from EP 0 153 579 A2. They allow to reduce the problems to a large extent. However, these systems are in particular deficient with regard to extensibility and/or strength and consequently only poorly suitable as elastic adhesives. Moreover, the selection of polyamines having sufficiently high molecular weights to obtain elastic properties within the cured final product is very limited. Either long-chain polyether-polyamine types that are commercially available, e.g., under the trade name Jeffamine® (from Huntsman), but relatively expensive, are used or other suitable polymeric structures with terminal amino groups are prepared, which, however, requires considerable effort. Additional disadvantages result from the presence of free amino groups of said polyamines. On the one hand the amino groups undergo undesirable reactions, e.g., with ester compounds or with carbon dioxide contained in the air. On the other hand, the amino groups of the polyamines severely restrict handling and create problems with regard to operational safety due to their basicity and corrosiveness.

DISCLOSURE OF THE INVENTION

Accordingly, it is the object of the present invention to provide curable compositions on the basis of surface-deactivated isocyanates overcoming the drawbacks of the state of the art.

Surprisingly, it has been found that a curable composition according to claim 1 is capable of solving this problem.

Such compositions are characterized by an extremely high storage stability as long as they are not heated.

In particular, hot curing compositions curing by the action of heat can be realized.

Moreover, in particular heat-activatable compositions can be realized as well. By the action of heat, such compositions not only cure but become activated such that they can cure under the influence of moisture.

Compositions having a high extensibility and strength, that is, an elongation at break of at least 300% and a tensile strength of at least 3.0 MPa, both measured according to DIN EN 53504, can be realized in a simple way. Such materials are especially suited as elastic adhesives.

In particular, these curable compositions are free from polyamines and consequently non-corrosive and advantageous with regard to handling and operational safety. In addition, the cure very fast and substantially free from voids.

The curable compositions are especially suitable as adhesives. Other aspects of the invention are the subject matter of additional independent claims. Especially preferred embodiments of the invention are the subject matter of the dependent claims.

Ways of Carrying out the Invention

The subject matter of the invention is a curable composition comprising
 a) at least one blocked amine BA having a blocked, hydrolytically activatable amino group and either at least one additional blocked, hydrolytically activatable amino group or at least one reactive group R selected from the group consisting of a hydroxyl group, mercapto group and a secondary amino group;
 b) at least one surface-deactivated polyisocyanate DI that is solid at room temperature; and
 c) optionally water or a substance generating water.

The term "primary amino group" as used in the present document refers to an amino group in the form of an $NH_2$ group bound to an organic moiety. The term "secondary amino group" refers to an amino group wherein the nitrogen atom is bound to two organic moieties which may also together be part of a ring. The term "tertiary amino group" refers to an amino group wherein the nitrogen atom (=tertiary amino nitrogen) is bound to three organic moieties wherein two of these moieties may also together be part of a ring.

The term "room temperature" as used in the present document refers to a temperature of 25° C.

Substance names starting with "poly" such as polyamine, polyol or polyisocyanate as used in the present document refer to substances formally containing two or more functional groups appearing in their name per molecule.

The term "polymer" as used in the present document, on the one hand, refers to a collective of chemically uniform macromolecules differing with respect to their degree of polymerization, molecular weight and chain length, said collective being was produced by a polyreaction (polymerization, poly-addition, polycondensation). On the other hand, the term also comprises derivatives of said collective of macromolecules resulting from polyreactions, that is, compounds which were obtained by reactions such as, e.g., additions or substitutions, of functional groups in predetermined macromolecules and which may be chemically uniform or chemically non-uniform. Moreover, the term also comprises so-called prepolymers, that is, reactive organic preadducts, the functional groups of which participate in the formation of macromolecules.

The term "polyurethane polymer" comprises all polymers manufactured according to the so-called diisocyanate polyaddition process. This term also includes those polymers that are nearly or completely free from urethane groups. Examples of polyurethane polymers are polyether polyurethanes, polyester polyurethanes, polyether polyureas, polyureas, polyester polyureas, polyisocyanurates and polycarbodiimides.

A "low-odor" substance is defined as a substance having an odor which is perceptible to, that is, smellable, by human individuals only to a slight extent, said substance consequently not having an intensive odor, whereby this slight odor is not considered to be unpleasant or repellent by most humans.

An "odor-free" substance is defined as a substance which cannot be smelled by most human individuals and consequently has no perceptible odor.

The term "final strength" as used in the present document refers to the strength of the completely cured composition, with "strength" in particular referring to the tensile strength and the elastic modulus.

The terms highlighted in bold, such as BA, R, DI, ALD or the like serve only to increase reading comprehension and identification.

The curable composition comprises at least one blocked amine BA having a blocked, hydrolytically activatable amino group and either at least one additional blocked, hydrolytically activatable amino group or at least one reactive group R selected from the group consisting of a hydroxyl group, mercapto group and a secondary amino group.

In particular, the blocked, hydrolytically activatable amino group of the blocked amine BA is selected from the group consisting of enamino groups, oxazolidino groups, ketimino groups and aldimino groups. In polyurethane chemistry, such blocked amines BA are substances known to be used as so-called latent hardeners in compositions containing isocyanate groups.

The term "oxazolidino group" as used in the present document refers both to tetrahydrooxazole groups (5-membered ring) and tetrahydrooxazine groups (6-membered ring).

The blocked amine BA can be obtained in particular from the condensation reaction of a primary or secondary amine and a ketone or aldehyde. Especially suitable as ketone are in particular acetone, methyl ethyl ketone, methyl propyl ketone, methyl isopropyl ketone, methyl isobutyl ketone, methyl pentyl ketone, methyl isopentyl ketone, diethyl ketone, dipropyl ketone, diisopropyl ketone, dibutyl ketone, diisobutyl ketone, cyclopentanone, cyclohexanone and acetophenone. Especially suitable as aldehyde are formaldehyde, acetaldehyde, propanal, 2-methylpropanal, butanal, 2-methylbutanal, 2-ethylbutanal, pentanal, 2-methylpentanal, 3-methylpentanal, 4-methyl-pentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropanecarboxaldehyde, cyclopentanecarboxaldehyde, cyclohexanecarboxaldehyde, diphenylacetaldehyde, benzaldehyde and substituted benzaldehydes and, moreover, aldehydes ALD of the formula (XI) described below in this document.

A blocked amine BA having at least one enamino group can be obtained in particular from the condensation reaction of an amine having at least one secondary amino group with at least one ketone or aldehyde having at least one hydrogen atom in the α position with respect to the carbonyl group and thus being enolizable, in particular the ketones acetone, methyl ethyl ketone, methyl propyl ketone, methyl isopropyl ketone, methyl isobutyl ketone, methyl pentyl ketone, methyl isopentyl ketone, diethyl ketone, dipropyl ketone, diisopropyl ketone, dibutyl ketone, diisobutyl ketone, cyclopentanone, cyclohexanone and the aldehydes acetaldehyde, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethyl-hexanal, heptanal, octanal, nonanal, decanal, undecanal, 2-methylundecanal, dodecanal, methoxyacetaldehyde, cyclopropanecarboxaldehyde, cyclopentanecarboxaldehyde, cyclohexanecarboxaldehyde, diphenylacetaldehyde. Suitable amines having at least one secondary amino group are, on the one hand, amines having at least two secondary amino groups, in particular piperazine, 2,5- and 2,6-dimethylpiperazine, 2,3,5,6-tetramethylpiperazine, 1,7-dioxa-4,10-diazacyclododecane, N,N'-dibutylethylenediamine; N,N'-di-tert.butyl-ethylenediamine, N,N'-dimethyl-1,6-hexanediamine, N,N'-diethyl-1,6-hexanediamine, N,N'-dimethyldiethylenetriamine, N,N'-dimethyldipropylenetriamine, 1-(1-methylethylamino)-3-(1-methylethylaminomethyl)-3,5,5-trimethyl-cyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)cyclohexyl)methane, 4,4'-trimethylenedipiperidine and N-alkylated polyetheramines, e.g., Jeffamine®-SD-231 (from Huntsman); moreover, amines having one hydroxyl group and one secondary amino group, in particular N-(2-hydroxyethyl)piperazine, 4-hydroxypiperidine and monoalkoxylated primary monoamines, such as, in particular, N-methylethanolamine, N-ethylethanolamine, N-butylethanolamine and N-butylisopropanolamine; moreover amines having a mercapto group and a secondary amino group, in particular N-(2-mercaptoethyl)piperazine, 4-mercaptopiperidine and 2-mercaptoethylbutylamine.

A blocked amine BA having at least one oxazolidino group can be obtained in particular from the condensation reaction of a least one hydroxyamine wherein the hydroxyl and the primary amino groups are separated by an optionally substituted ethylene or trimethylene moiety with at least one ketone or aldehyde, in particular formaldehyde or one of the above-mentioned enolizable ketones or aldehydes; especially suitable are aldehydes, in particular 2-methylpropanal. Especially suitable as hydroxyamine are diethanolamine and diisopropylamine which can be reacted to form hydroxyoxazolidines, from which polyoxazolidines can easily be made, e.g., by reacting with a polyisocyanate or a polyester.

In one embodiment, a preferred blocked amine BA is an oxazolidine BA1 having an oxazolidino group and either at least one additional blocked, hydrolytically activatable amino group or at least one reactive group R selected from the group consisting of a hydroxyl group, mercapto group and a secondary amino group.

Suitable commercial oxazolidines are, e.g., the Härter OZ (from Bayer), Zoldine® RD-4 (from Angus Chemical) and Incozol® 3, Incozol® LV, Incozol® 4, Incozol® HP and Incozol® NC (from Industrial Copolymers).

In particular, a blocked amine BA having at least one ketimino or aldimino group can be obtained by a condensation reaction of an amine having at least one primary amino group with at least one above-mentioned ketone or aldehyde. If a ketone is used for blocking a primary amino group, a ketimino group is formed, whereas a aldimino group is formed if an aldehyde is used. Especially suitable as amines having at least one primary amino group are amines B1 of the formula (X a) and amines B2 of the formula (X b) mentioned hereinafter.

Suitable commercial ketimines or aldimines are, e.g., Epikure® Curing Agent 3502 (from Resolution Performance Products), Desmophen® LS 2965A (from Bayer) and Vestamin® A 139 (from Evonik Degussa).

Ketimino and aldimino groups derived from an enolizable ketone or aldehyde, that is, a ketone or aldehyde having a hydrogen atom in α position with respect to the C atom of the carbonyl groups, can tautomerize to enamino groups; hence, they are capable of forming enamines. Therefore, such ketimino and aldimino groups will be referred to as ketimino and aldimino groups "capable of forming enamines" hereinafter.

When heated, enamino groups and ketimino and aldimino groups capable of forming enamines may also directly react with isocyanate groups without water, that is, without hydrolysis. However, in the presence of water the reaction with isocyanates proceeds much faster.

In another embodiment, an especially preferred blocked amine BA is an aldimine BA2 of the formula (I),

(I)

where
n represents 1 or 2 or 3 or 4 and
m represents 0 or 1,
provided that m+n represents 2 or 3 or 4;
and where
A represents either an m+n-valent hydrocarbon moiety having from 2 to 30 C atoms optionally containing at least one hetero atom, in particular in the form of ether oxygen or tertiary amine nitrogen,
or together with $R^7$ represents an (n+2)-valent hydrocarbon moiety having from 3 to 30 C atoms optionally containing at least one hetero atom, in particular in the form of ether oxygen or tertiary amine nitrogen;
X represents O or S or N—$R^6$ or N—$R^7$,
where $R^6$
either represents a monovalent hydrocarbon moiety having from 1 to 20 C atoms optionally containing at least one carboxylic acid ester, nitrile, nitro, phosphonic acid ester, sulfone or sulfonic acid ester group,
or a substituent of the formula (II),

(II)

where
E represents a divalent hydrocarbon moiety having from 2 to 12 C atoms and optionally containing ether oxygen or tertiary amine nitrogen and
$R^7$ together with A represents an (n+2)-valent hydrocarbon moiety having from 3 to 30 C atoms optionally containing at least one hetero atom, in particular in the form of ether oxygen or tertiary amine nitrogen; and
Z is free from reactive groups R and primary amino groups and
either represents a moiety $Z^1$ of the formula (III),

(III)

where
Y represents a monovalent hydrocarbon moiety having from 1 to 32 C atoms optionally containing at least one hetero atom, in particular oxygen or nitrogen, in the form of ether, carbonyl, ester, amido, urea, urethane or tertiary amino groups and
$R^1$ and $R^2$
either independently of each other each represent a monovalent hydrocarbon moiety having from 1 to 12 carbon atoms,
or together represent a divalent hydrocarbon moiety having from 4 to 12 carbon atoms which is part of an optionally substituted carbocyclic ring having from 5 to 8, preferably 6 C atoms,
or represents a moiety $Z^2$,
where $Z^2$ either represents a substituted or unsubstituted aryl or heteroaryl ring having a ring size of from 5 to 8, preferably 6 atoms,
or represents

were $R^0$ represents a hydrogen atom or an alkoxy moiety or a substituted or unsubstituted alkenyl or arylalkenyl moiety having at least 6 C atoms.

The dotted lines in the formulas in this document in each case represent the bond between a substituent and the respective moiety of the molecule.

The aldimines BA2 of the formula (I) contain aldimino groups that do not have a hydrogen atom at the C atom in α position with respect to the carbonyl group and thus cannot tautomerize to enamino groups and, hence, are not capable of forming enamines. Consequently, these aldimino groups are especially well protected ("blocked") primary amino groups. Hereinafter, such aldimino groups will also be referred to as "aldimino groups not capable of forming enamines".

Preferably, A does not contain reactive groups R and no primary amino groups.

Z preferably represents $Z^1$.

$R^1$ and $R^2$ preferably each represent a methyl moiety.

$Z^1$ preferably represents a moiety of the formula (III a) or (III b) or (IIIc) or (III d),

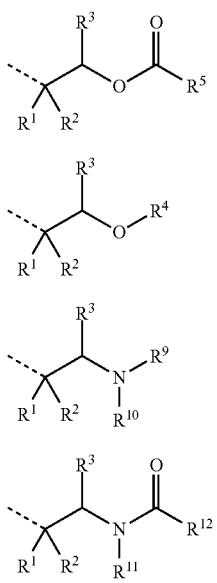

(III a)

(III b)

(III c)

(III d)

where
R$^3$ represents a hydrogen carbon or an alkyl group or a cycloalkyl group or an arylalkyl group having from 1 to 12 C atoms;
R$^4$ represents a hydrocarbon moiety having from 1 to 30 C atoms optionally containing ether oxygen;
R$^5$ either
  represents a hydrogen atom,
  or represents a linear or branched alkyl moiety having from 1 to 30 C atoms optionally with cyclic proportions and optionally containing at least one hetero atom, in particular oxygen in the form of ether, carbonyl or ester groups,
  or represents a mono- or polyunsaturated linear or branched hydrocarbon moiety having from 5 to 30 C atoms, or represents an optionally substituted aromatic or heteroaromatic 5- or 6-membered ring;
R$^9$ and R$^{13}$ either
  independently of each other each represent a monovalent aliphatic, cycloaliphatic or arylaliphatic moiety having from 1 to 20 carbon atoms optionally containing hetero atoms in the form of ether oxygen or tertiary amine nitrogen,
  or together represent a divalent aliphatic moiety having from 3 to 20 C atoms being part of an optionally substituted heterocyclic ring with 5 to 8, preferably 6 ring atoms and optionally containing additional hetero atoms in the form of ether oxygen or tertiary amine nitrogen in addition to the nitrogen atom, and
R$^{11}$ and R$^{12}$ either
  together represent a divalent moiety having from 2 to 10 C atoms optionally containing oxygen or sulfur atoms being part of an optionally substituted 5- or 6- or 7-membered ring, or
  R$^{11}$ represents an alkyl, cycloalkyl, arylalkyl or acyl moiety having from 1 to 10 C atoms, and
  R$^{12}$ represents a hydrogen atom or a monovalent moiety having from 1 to 20 C atoms selected from the group consisting of alkyl, cycloalkyl, arylalkyl, aryl moieties, —OR$^{12'}$, —SR$^{12'}$ and —NR$^{12'}$R$^{12''}$, where R$^{12'}$ and R$^{12''}$ either each represent a hydrocarbon moiety or together represent an alkylene moiety being part of a 5-, 6- or 7-membered ring.

R$^3$ preferably represents a hydrogen atom.

R$^4$ preferably represents a hydrocarbon moiety having from 6 to 30 C atoms, in particular from 11 to 30 C atoms optionally containing ether oxygen.

R$^5$ preferably represents a linear or branched alkyl moiety having from 6 to 30, in particular from 11 to 30 C atoms, optionally containing cyclic proportions and optionally containing at least one hetero atom of a mono- or polyunsaturated, linear or branched hydrocarbon moiety having from 6 to 30, in particular from 11 to 30 C atoms.

R$^9$ and R$^{10}$ preferably each represent methyl, ethyl, propyl, isopropyl, butyl, isobutyl, 2-ethylhexyl, cyclohexyl or benzyl or together form a ring incorporating the nitrogen atom, in particular a pyrrolidine, piperidine, morpholine or n-alkylpiperazin ring, said ring optionally being substituted.

R$^{11}$ preferably represents a methyl, ethyl, propyl, isopropyl, butyl-, 2-ethylhexyl, cyclohexyl or benzyl moiety and R$^{12}$ a hydrogen atom or a methyl, ethyl, propyl, isopropyl, butyl, 2-ethylhexyl, cyclohexyl, benzyl, methoxy, ethoxy, propoxy or isopropoxy moiety, or R$^{11}$ and R$^{12}$ together form a ring incorporating the nitrogen atom and the carbonyl or the thiocarbonyl group, in particular a 2-pyrrolidone ring, a pyrrolidine-2,5-dione ring, a piperidine-2-one ring, a piperidine-2,6-dione ring, an azepane-2-one ring, an oxazolidine-2-one ring or a thiazolidine-2-one ring, said ring optionally being substituted.

Most preferably, Z$^1$ represents a moiety of the formula (III a'),

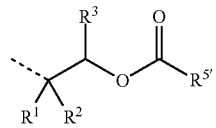

(III a')

where
R$^5$ either
  represents a linear or branched alkyl moiety having from 6 to 30, in particular from 11 to 30 C atoms optionally with cyclic proportions and optionally containing at least one hetero atom, in particular oxygen in the form of ether, carbonyl or ester groups,
  or represents a mono- or polyunsaturated linear or branched hydrocarbon moiety having from 6 to 30, in particular from 11 to 30 C atoms;
and R$^1$, R$^2$ and R$^3$ have the above-mentioned meanings.

Most preferably, R$^{5'}$ represents a C$_{11}$ alkyl moiety.

Aldimines BA2, where Z represents a moiety Z$^1$ of the formula (III a'), will be referred to as aldimines BA2' hereinafter. The aldimines BA2' are advantageous in that they are low in odor or odor-free and that the aldehyde releasable therefrom is also low in odor or odor-free. Provided that the moiety R$^{5'}$ has at least 11 C atoms, the aldimines are odor-free and the aldehyde releasable therefrom is also odor-free.

In a preferred embodiment of an aldimine BA2 of the formula (I), m represents 1. Such aldimines BA2 of the formula (I) are represented by aldimines BA2a of the formula (VIII).

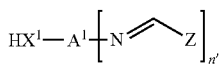  (VIII)

Here, n' represents 1 or 2 or 3, preferably 1 or 2, especially preferably 1;

$A^1$ either represents an (n'+1)-valent hydrocarbon moiety having from 2 to 30 C atoms optionally containing at least one hetero atom, in particular in the form of ether oxygen or tertiary amine nitrogen, or together with $R^8$ represents an (n'+2)-valent hydrocarbon moiety having from 3 to 30 C atoms optionally containing at least one hetero atom, in particular in the form of ether oxygen or tertiary amine nitrogen;

$X^1$ represents O or S or N—$R^6$ or N—$R^8$,
  where $R^8$ together with $A^1$ represents an (n'+2)-valent hydrocarbon moiety having from 3 to 30 C atoms optionally containing at least one hetero atom, in particular in the form of ether oxygen or tertiary amine nitrogen;

and Z and $R^6$ have the above-mentioned meanings.

The aldimines BA2a of the formula (VIII) are particularly suited for the manufacture of polymeric blocked amines described hereinafter.

In another preferred embodiment of an aldimine BA2 of the formula (I), m represents 0, Such aldimines BA2 of the formula (I) are represented by aldimines BA2a of the formula (IX).

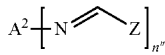  (IX)

Here, n" represents 2 or 3 or 4, preferably 2 or 3, especially preferably 2;

$A^2$ represents an n"-valent hydrocarbon moiety having from 2 to 30 C atoms optionally containing at least one hetero atom, in particular in the form of ether oxygen or tertiary amine nitrogen, and Z has the above-mentioned meaning.

An aldimine BA2 of the formula (I) can be obtained by the condensation reaction of at least one amine B of the formula (X) and at least one aldehyde ALD of the formula (XI),

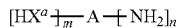  (X)

  (XI)

where $X^a$ represents O or S or N—$R^{6a}$ or N—$R^7$,
  where $R^{6a}$ either represents a monovalent hydrocarbon moiety having from 1 to 20 C atoms optionally containing at least one carboxylic acid ester, nitrile, nitro, phosphonic acid ester, sulfone or sulfonic acid ester group, or a substituent of the formula (II a), -E-$NH_2$  (II a)

and m, n, A, $R^7$, E and Z have the above-mentioned meanings.

Detailed information on this condensation is provided in WO 2007/036571 A1, in particular on p. 5 to p. 7, the contents of which is hereby incorporated by reference.

As amine B of the formula (X), in a first embodiment amines B1 of the formula (X a) are suited,

  (X a)

where $X^{1a}$ represents O or S or N—$R^{6a}$ or N—$R^8$;

and n', $A^1$, $R^{6a}$ and $R^8$ have the above-mentioned meanings.

The reaction of an amine B1 of the formula (X a) with an aldehyde ALD of the formula (XI) yields an aldimine BA2a of the formula (VIII).

Suitable amines BA2a are in particular compounds with one or two primary aliphatic and one secondary amino group, such as, e.g., N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethyl-piperidine, 3-(4-aminobutyl)piperidine, N-(2-aminoethyl)piperazine, diethylenetriamine (DETA), bis-hexamethylenetriamine (BHMT), 3-(2-aminoethyl)aminopropylamine; di- and triamines resulting from the cyanoethylation or cyanobutylation and subsequent hydrogenation of primary mono and diamines, e.g., N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethyl-hexyl)amino-1-pentylamine, 3-dodecylamino-1-pentylamine, 3-cyclohexylamino-1-pentylamine, dipropylenetriamine (DPTA), N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine and fatty diamines such as N-cocoalkyl-1,3-propanediamine, N-oleyl-1,3-propanediamine, N-soya alkyl-1,3-propanediamine, N-tallow alkyl-1,3-propanediamine or N-($C_{16-22}$-alkyl)-1,3-propanediamine obtainable, e.g., under the trade name Duomeen® from Akzo Nobel; the products obtained by the Michael-type addition of aliphatic primary di- or triamines and acrylonitrile, maleic or fumaric acid diesters, citraconic acid diesters, acrylic and methacrylic acid esters, acrylic and methacrylic acid amides and itaconic acid diesters reacted with a molar ratio of 1:1;

hydroxyamines such as, e.g., 2-aminoethanol, 2-amino-1-propanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol; glycol derivatives carrying one primary amino group such as diethylene glycol, dipropylene glycol, dibutylene glycol and higher oligomers and polymers of said glycols, e.g., 2-(2-aminoethoxy)ethanol, 2-(2-(2-aminoethoxy)ethoxy)ethanol, α-(2-hydroxymethyl-ethyl)-ω-(2-aminomethylethoxy)poly(oxy(methyl-1,2-ethanediyl)); derivatives of polyalkoxylated tri- or polyhydric alcohols carrying a hydroxyl group and a primary amino group; products resulting from a single cyanoethylation and subsequent hydrogenation of glycols, e.g., 3-(2-hydroxyethoxy)propylamine, 3-(2-(2-hydroxyethoxy)ethoxy)propylamine and 3-(6-hydroxyhexyl-oxy)propylamine;

mercaptoamines such as, e.g., 2-aminoethanethiol (cysteamine), 3-aminopropanethiol, 4-amino-1-butanethiol, 6-amino-1-hexanethiol, 8-amino-1-octanethiol, 10-amino-1-decanethiol and 12-amino-1-dodecanethiol.

The amine B1 is preferably N-methyl-1,2-ethanediamine, N-ethyl-1,2-ethanediamine, N-cyclohexyl-1,2-ethanediamine, N-methyl-1,3-propanedi-amine, N-ethyl-1,3-propanediamine, N-butyl-1,3-propanediamine, N-cyclohexyl-1,3-propanediamine, 4-aminomethyl-piperidine, 3-(4-aminobutyl)-piperidine, DETA, DPTA, BHMT and fatty amines such as N-cocoalkyl-1,3-propanediamine, N-oleyl-1,3-propanediamine, N-soya alkyl-1,3-propanediamine and N-tallow alkyl-1,3-propanediamine; products obtained by the Michael-type addition reaction of aliphatic primary diamines and maleic and fumaric acid diesters, acrylic and methacrylic acid esters, acrylic and methacrylic acid amides, preferably with maleic acid diesters, in particular maleic acid dimethyl, diethyl, dipropyl and dibutyl ester, and with acrylic acid esters, in particular acrylic acid methyl ester, reacted with a molar ratio of 1:1; and aliphatic hydroxy or mercapto amines wherein the primary amino group is separated from the hydroxyl or mercapto group by a chain having at least 5 atoms or by a ring, in particular 5-amino-1-pentanol, 6-amino-1-hexanol and higher homologs thereof, 4-(2-aminoethyl)-2-hydroxyethylbenzene, 3-aminomethyl-3,5,5-trimethylcyclohexanol, 2-(2-aminoethoxy)ethanol, triethylene glycol monoamine and higher oligomers and polymers thereof, 3-(2-hydroxyethoxy)propylamine, 3-(2-(2-hydroxyethoxy)-ethoxy)propylamine and 3-(6-hydroxyhexyloxy)propylamine.

Especially preferred as amine B1 are amines selected from the group consisting of N-methyl-1,2-ethanediamine, N-ethyl-1,2-ethanediamine, N-cyclohexyl-1,2-ethanediamine, N-methyl-1,3-propanediamine, N-ethyl-1,3-propanediamine, N-butyl-1,3-propanediamine, N-cyclohexyl-1,3-propanediamine, 4-aminomethylpiperidine, 3-(4-aminobutyl)-piperidine, DETA, DPTA, BHMT, fatty diamines, in particular N-coco alkyl-1,3-propanediamine, N-oleyl-1,3-propanediamine, N-soya alkyl-1,3-propanediamine and N-tallow alkyl-1,3-propanediamine; 5-amino-1-pentanol, 6-amino-1-hexanol, 4-(2-aminoethyl)-2-hydroxyethylbenzene, 3-aminomethyl-3,5,5-trimethylcyclohexanol, 2-(2-aminoethoxy)ethanol, triethylene glycol monoamine, 3-(2-hydroxyethoxy)propyl-amine, 3-(2-(2-hydroxyethoxy)ethoxy)propylamine and 3-(6-hydroxyhexyloxy)propylamine.

Most preferred as amine B1 are amines selected from the group consisting of 5-amino-1-pentanol, 6-amino-1-hexanol, 4-(2-aminoethyl)-2-hydroxyethylbenzene, 3-aminomethyl-3,5,5-trimethylcyclohexanol, 2-(2-aminoethoxy)ethanol, triethylene glycol monoamine, 3-(2-hydroxyethoxy)propylamine, 3-(2-(2-hydroxyethoxy)ethoxy)propylamine and 3-(6-hydroxyhexyloxy)propylamine.

In another embodiment, a suitable amine B of the formula (X) is an amine B2 of the formula (X b),

where n″ and $A^2$ have the above-mentioned meanings.

The reaction of an amine B2 of the formula (X b) with an aldehyde ALD of the formula (XI) yields an aldimine BA2b of the formula (IX).

Suitable amines B2 are in particular aliphatic, cycloaliphatic or arylaliphatic diamines, e.g., ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)methane ($H_{12}$-MDA), bis-(4-amino-3-methylcyclohexyl)-methane, bis-(4-amino-3-ethylcyclohexyl)methane, bis-(4-amino-3,5-dimethylcyclohexyl)methane, bis-(4-amino-3-ethyl-5-methylcyclohexyl)-methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0$^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]undecane and 1,3- and 1,4-xylylenediamine;

aliphatic diamines containing ether groups, e.g., bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, bis-(3-aminopropyl) polytetrahydrofurane and other polytetrahydrofurane diamines having molecular weights up to 550 and polyoxyalkylene diamines having molecular weights up to 600. Typically, the latter are products of the amination of polyoxyalkylene diols and can for example be obtained under the name Jeffamine® (from Huntsman), under the name Polyetheramin (from BASF) or under the name PC Amine® (from Nitroil). Particularly suitable polyoxyalkylene diamines are Jeffamine® D-230, Jeffamine® D-400, Jeffamine® ED-600, Jeffamine® XTJ-568, Jeffamine®XTJ-569, Jeffamine® EDR-104, Jeffamine® EDR-148, Jeffamine® EDR-176; Polyetheramin D 230, Polyetheramin D 400, PC Amine® DA 250 and PC Amine® DA 400;

aliphatic, cycloaliphatic or arylaliphatic triamines such as 4-aminomethyl-1,8-octanediamine, 1,3,5-tris(aminomethyl)benzene, 1,3,5-tris-(aminomethyl)-cyclohexane, tris-(2-aminoethyl)amine, tris(2-aminopropyl)amine, tris(3-aminopropyl)amine;

polyoxyalkylene triamines with molecular weights up to 600 that are typically products obtained by the amination of polyoxyalkylene triols and commercially available under the trade name Jeffamine® (from Huntsman), under the name Polyetheramin (from BASF) or under the name PC Amine® (from Nitroil), such as, e.g., Jeffamine® T-403, Polyetheramin T403 and PC Amine® TA 403;

aromatic di- and triamines, such as, e.g., 1,2-, 1,3- and 1,4-phenylenediamine, 2,4- and 2,6-toluoylenediamine (TDA), 3,4-toluoylenediamine, 3,5-dimethylthio-2,4- and -2,6-toluoylenediamine, 3,5-diethyl-2,4- and -2,6-toluoylenediamine (DETDA), 2,4,6-triethyl-1,3-phenylenediamine, 2,4,6-triisopropyl-1,3-phenylenediamine, 3-ethyl-5-methyl-2,4-toluoylenediamine, 3,5-diisopropyl-2,4-toluoylenediamine, 3,5-bis-(1-methyl propyl)-2,4-toluoylenediamine, 3,5-bis-(tert.butyl)-2,4-toluoylenediamine, 3-ethyl-5-isopropyl-2,4-toluoylenediamine, 5-isopropyl-2,4-toluoylenediamine, 5-(tert.butyl)-2,4-toluoylenediamine, 4,6-bis-(1-methylpropyl)-1,3-phenylenediamine, 4-isopropyl-6-(tert.butyl)-1,3-phenylenediamine, 4-ethyl-6-isopropyl-1,3-phenylenediamine, 4-ethyl-6-(2-methylpropyl)-1,3-phenylenediamine, 4-ethyl-6-(1-methylpropyl)-1,3-phenylenediamine, 4-ethyl-6-(2-methylpropyl)-1,3-phenylenediamine, 4-isopropyl-6-(1-methylpropyl)-1,3-phenylenediamine, 4-(tert.butyl)-6-(2-methylpropyl)-1,3-phenylenediamine, 4-cyclopentyl-6-ethyl-1,3-phenylenediamine, 4-cyclopentyl-6-isopropyl-1,3-phenylenediamine, 4,6-dicyclopentyl-1,3-phenylenediamine, 3-isopropyl-2,6-toluoylenediamine, 2-methylpropyl-(4-chloro-3,5-diamino benzoate), tert.butyl-(4-chloro-3,5-diamino benzoate), 2,6-diaminopyridine, melamine, 4,4'-, 2,4'- and 2,2'-diaminodiphenylmethane (MDA), 3,3'-dimethyl-4,4'-diaminodiphenylmethane, 3,3'-dichloro-4,4'-diaminodiphenylmethane (MOCA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 3,3',5,5'-tetra-(1-methylpropyl)-4,4'-diaminodiphenylmethane, 3,3'-dimethyl-5,5'-ditert.butyl-4,4'-diaminodiphenylmethane, 3,3'-di-tert.butyl-4,4'-diaminodiphenylmethane, 4,4'-diaminodiphenylsulfone (DDS), 4-amino-N-(4-aminophenyl)benzenesulfonamide, 5,5'-methylenedianthranilic acid, dimethyl(5,5'-methylenedianthranilate), 1,3-propylenebis(4-amino benzoate), 1,4-butylenebis(4-amino benzoate), polytetramethylene oxidebis(4-amino benzoate) (available as Versalink® from Air Products) and 1,2-bis-(2-aminophenylthio)ethane;

polyamines with primary aromatic and primary aliphatic amino groups, in particular 4-aminoethylaniline, 4-aminomethylaniline, 4-[(4-aminocyclohexyl)methyl] aniline, 2-aminoethylaniline, 2-aminomethylaniline, 2-[(4-aminocyclohexyl)methyl]aniline and 4-[(2-aminocyclohexyl)methyl]aniline.

Preferably the amine B2 is selected from the group consisting of 1,6-hexamethylenediamine, MPMD, DAMP, IPDA, TMD, 1,3-xylylenediamine, 1,3-bis(aminomethyl)cyclohexane, bis(4-aminocyclohexyl)methane, bis(4-amino-3-methylcyclohexyl)methane, 3(4),8(9)-bis(aminomethyl)tricyclo[5.2.1.0$^{2,6}$]-decane, 1,2-, 1,3- and 1,4-diaminocyclohexane, 1,4-diamino-2,2,6-trimethylcyclohexane, 3,6-dioxaoctane-1,8-diamine, 4,7-dioxadecane-1,10-diamine, 4-aminomethyl-1,8-octanediamine, polyoxyalkylene polyamines having two or three amino groups and a molecular weight up to 600, in particular the Huntsman types D-230, D-400 and T-403 available under the trade name Jeffamine® and compounds analogous therewith from BASF or Nitroil; 1,3- and 1,4-phenylenediamine, 2,4- and 2,6-toluoylenediamine, 4,4'-, 2,4'- and 2,2'-diaminodiphenylmethane, 3,3'-dichloro-4,4'-diaminodiphenylmethane and mixtures of the mentioned polyamines.

The aldehydes ALD of the formula (XI) are not enolizable. Aldimines with aldimino groups manufactured from a non-enolizable aldehyde cannot form enamino groups and therefore represent especially well blocked amines.

In a preferred embodiment, the aldehyde ALD has a moiety $Z^1$ of the formula (III a). Such aldehydes are esters of aliphatic, cycloaliphatic or arylaliphatic 2,2-disubstituted 3-hydroxy aldehydes, such as, e.g., 2,2-dimethyl-3-hydroxypropanal, 2-hydroxymethyl-2-methylbutanal, 2-hydroxymethyl-2-ethylbutanal, 2-hydroxymethyl-2-methylpentanal, 2-hydroxymethyl-2-ethyl-hexanal, 1-hydroxymethylcyclopentane carboxaldehyde, 1-hydroxymethyl-cyclohexane carboxaldehyde, 1-hydroxymethylcyclohex-3-ene carboxaldehyde, 2-hydroxymethyl-2-methyl-3-phenylpropanal, 3-hydroxy-2-methyl-2-phenylpropanal and 3-hydroxy-2,2-diphenylpropanal, with suitable carboxylic acids, where, for example, the following carboxylic acids are suitable: saturated aliphatic carboxylic acids, such as formic acid, acetic acid, propionic acid, butyric acid, isobutyric acid, valeric acid, caproic acid, 2-ethyl-caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid; monounsaturated aliphatic carboxylic acids such as palmitoleic acid, oleic acid, erucic acid; polyunsaturated aliphatic carboxylic acids such as linoleic acid, linolenic acid, eleostearic acid, arachidonic acid; cycloaliphatic carboxylic acids such as cyclohexane carboxylic acid; arylaliphatic carboxylic acids such as phenylacetic acid; aromatic carboxylic acids such as benzoic acid, naphthoic acid, toluoylic acid, anisic acid; isomers of these acids; fatty acid mixtures resulting from the technical saponification of natural oils and fats, such as, for example, rapeseed oil, sunflower oil, linseed oil, olive oil, coconut oil, palm kernel oil and palm oil; as well as dicarboxylic acid monoalkyl- and -aryl esters, as they are obtained from the simple esterification of dicarboxylic acids such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and similar derivatives of polyethylene glycol, with alcohols such as methanol, ethanol, propanol, butanol, higher homologs and isomers of these alcohols. Preferred are carboxylic acids having at least 7 C atoms, in particular those having from 12 to 31 C atoms, in particular lauric acid, myristic acid, palmitic acid, stearic acid and oleic acid. Especially preferred is lauric acid.

In another preferred embodiment, the aldehyde ALD has a moiety $Z_1$ of the formula (III b). Such aldehydes are ethers of aliphatic, cycloaliphatic or arylaliphatic 2,2-disubstituted 3-hydroxy aldehydes with alcohols or phenols of the formula $R^4$—OH. Preferred aldehydes ALD in the form of such ethers are 2,2-dimethyl-3-phenoxypropanal, 3-cyclohexyloxy-2,2-dimethylpropanal, 2,2-dimethyl-3-(2-ethylhexyloxy)propanal, 2,2-dimethyl-3-lauroxypropanal and 2,2-dimethyl-3-stearoxypropanal.

In another preferred embodiment, the aldehyde ALD has a moiety $Z^1$ of the formula (III c). In particular, such aldehydes can be obtained as products of a Mannich reaction or an α-aminoalkylation analogous to a Mannich reaction as known from technical literature; therefore, such an aldehyde can also be referred to as Mannich base. In this reaction a secondary aldehyde, in particular isobutyric aldehyde, another aldehyde, in particular formaldehyde, and a secondary aliphatic amine are reacted with elimination of water to yield an aldehyde ALD. Especially suitable aldehydes ALD in the form of such a Mannich base are 2,2-dimethyl-3-dimethylaminopropanal, 2,2-dimethyl-3-diethylaminopropanal, 2,2-dimethyl-3-dibutylaminopropanal, 2,2-dimethyl-3-(N-pyrrolidino)propanal, 2,2-dimethyl-3-(N-piperidino)propanal, 2,2-dimethyl-3-(N-morpholino)propanal, 2,2-dimethyl-3-(N-(2,6-dimethyl)morpholino)propanal, 2,2-dimethyl-3-(N-benzylmethylamino)propanal, 2,2-dimethyl-3-(N-benzylisopropylamino)propanal and 2,2-dimethyl-3-(N-cyclohexylmethylamino)-propanal.

In another preferred embodiment, the aldehyde ALD has a moiety $Z^1$ of the formula (III d). In particular, such aldehydes can be obtained in the same manner as the aldehydes ALD having a moiety $Z^1$ of the formula (III c), that is, as the product of a Mannich reaction, using, however, an amide, lactam, carbamate or imide instead of a secondary aliphatic amine. Especially suited aldehydes ALD having a moiety $Z^1$ of the formula (III d) are N-(2,2-dimethyl-3-oxopropyl)-N-methylacetamide, N-(2,2-dimethyl-3-oxopropyl)-N-butyl-acetamide, N-(2,2-dimethyl-3-oxopropyl)-N-(2-ethylhexyl)acetamide, N-(2,2-dimethyl-3-oxopropyl)-N-benzylacetamide, N-(2,2-dimethyl-3-oxopropyl)-N-methyl butyramide, N-(2,2-dimethyl-3-oxopropyl)-N-methyl-(2-ethyl-capronamide), N-(2,2-dimethyl-3-oxopropyl)-N-methylbenzamide, O-ethyl-N-(2,2-dimethyl-3-oxopropyl)-N-methyl carbamate, N-(2,2-dimethyl-3-oxopropyl)-pyrrolidine-2-one, N-(2,2-dimethyl-3-oxopropyl)piperidine-2-one, N-(2,2-dimethyl-3-oxopropyl)azepane-2-one, N-(2,2-dimethyl-3-oxopropyl)oxazolidine-2-on, N-(2,2-dimethyl-3-oxopropyl)pyrrolidine-2,5-dione and N-(2,2-dimethyl-3-oxopropyl)phthalimide.

In another preferred embodiment, the aldehyde ALD has a moiety $Z^2$. Such aldehydes ALD are, e.g., aromatic aldehydes such as benzaldehyde, 2- and 3- and 4-tolualdehyde, 4-ethyl- and 4-propyl- and 4-isopropyl and 4-butyl-benzaldehyde, 2,4-dimethylbenzaldehyde, 2,4,5-trimethylbenzaldehyde, 4-acetoxybenzaldehyde, 4-anisaldehyde, 4-ethoxybenzaldehyde, the isomeric di- and trialkoxybenzaldehydes, 2-, 3- and 4-nitrobenzaldehyde, 2- and 3- and 4-formylpyridine, 2-furfuraldehyde, 2-thiophenecarbaldehyde, 1- and 2-naphthylaldehyde, 3- and 4-phenyloxybenzaldehyde, quinoline-2-carbaldehyde and its 3-, 4-, 5-, 6-, 7- and 8-positional isomers, and anthracene-9-carbaldehyde; as well as, in addition, glyoxal, glyoxalic acid ester, such as, e.g., glyoxalic acid methyl ester, cinnamaldehyde and substituted cinnamaldehydes.

Preferred as aldehyde ALD of the formula (XI) are 2,2-dimethyl-3-lauroyloxypropanal, 2,2-dimethyl-3-myristoyloxypropanal, 2,2-dimethyl-3-palmitoyloxypropanal, 2,2-dimethyl-3-stearoyloxypropanal and 2,2-dimethyl-3-oleyloxypropanal.

The most preferred aldehyde ALD of the formula (XI) is 2,2-dimethyl-3-lauroyloxypropanal.

In one embodiment, the blocked amine BA is a polymeric blocked amine PBA that is a polymer having at least two blocked, hydrolytically activatable amino groups.

In particular, the blocked, hydrolytically activatable amino groups of the polymeric blocked amine PBA are selected from the group consisting of enamino groups, oxazolidino groups, ketimino groups and aldimino groups.

In one embodiment, a polymeric blocked amine PBA can be obtained from a polymer with terminal amino groups, such as, e.g., a higher oligomer of 5,8-dioxadodecane-3,10-diamine, a polytetrahydrofuranediamine and in particular from polyoxyalkylenedi- and -triamines. Typically, the latter are products of the amination of polyoxyalkylene di- and triols and can for example be obtained under the name Jeffamine® (from Huntsman), under the name Polyetheramin (from BASF) or under the name PC Amine® (from Nitroil). Particularly suitable polyoxyalkylenediamines are Jeffamine® D-2000, Jeffamine® D-4000, Jeffamine® XTJ-511, Jeffamine® ED-900, Jeffamine® ED-2003, Jeffamine® XTJ-523, Jeffamine® XTJ-536, Jeffamine® XTJ-542, Jeffamine® XTJ-559 and Polyetheramine D 2000, PC Amine® DA 650 and PC Amine® DA 2000. Particularly suitable polyoxyalkylenetriamines are Jeffamine® T-3000, Jeffamine® T-5000, Polyetheramin T5000 and PC Amine® TA 5000. The amino groups of such polymers having terminal amino groups can be converted to blocked amino groups in the same manner as described above.

In another embodiment, a polymeric blocked amine PBA can in particular be obtained by reacting a polyurethane polymer PUP containing isocyanate groups with a blocked amine BA having at least one blocked amino group and at least one reactive group R selected from the group consisting of a hydroxyl group, mercapto group and a secondary amino group.

In particular, the polyurethane polymer PUP can be obtained by reacting at least one polyol with at least one polyisocyanate. This reaction can be carried out in that the polyol and the polyisocyanate are reacted with commonly used methods, for example at temperatures of 50° C. to 100° C., optionally with simultaneous use of suitable catalysts, whereby the polyisocyanate can be metered in such a way that its isocyanate groups are present in stoichiometric excess relative to the hydroxyl groups of the polyol. The polyisocyanate can be advantageously metered in such a way that an NCO/OH ratio of 1.3 to 5, in particular, 1.5 to 3, is maintained. The "NCO/OH ratio" means the ratio of the number of isocyanate groups used to the number of hydroxyl groups used. Preferably, after the reaction of all hydroxyl groups of the polyol a content of free isocyanate groups of 0.5 to 15% by weight, especially preferred of 0.5 to 5% by weight, can remain in the polyurethane polymer PUP.

Optionally, the polyurethane polymer PUP can be produced with simultaneous use of softeners, provided that the used softeners do not contain any groups that are reactive relative to isocyanates.

As polyol for the production of the polyurethane polymer PUP, e.g., the following commercially available polyols or mixtures thereof can be used:

Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms such as, for example, water, ammonia or compounds with several OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethyl-olethane, 1,1,1-trimethylolpropane, glycerol, aniline, as well as mixtures of the above-mentioned compounds. Both polyoxyalkylene polyols with a low degree of unsaturation (measured according to ASTM D-2849-69 and indicated in milliequivalents of unsaturation per gram of polyol (mEq/ g)) and being produced, for example, using so-called double-metal cyanide complex catalysts (DMC catalysts) as well as polyoxyalkylene polyols having a higher degree of unsaturation and being produced, for example, using anionic catalysts, such as NaOH, KOH, CsOH or alkali alcoholates, can be used. Especially preferred are polyoxyalkylene diols or polyoxyalkylene triols, in particular polyoxyethylene and polyoxypropylene diols and triols.

Polyoxyalkylene diols and triols with a degree of unsaturation that is less than 0.02 mEq/g and with a molecular weight in the range of 1,000-30,000 g/mol, as well as polyoxypropylene diols and triols with a molecular weight of 400-8,000 g/mol are especially suitable.

So-called ethylene oxide-terminated ("EO-endcapped," ethylene oxide-endcapped) polyoxypropylene polyols are suitable as well. The latter are special polyoxypropylene polyoxyethylene polyols which can be obtained, for example, in that pure polyoxypropylene polyols, in particular poly-oxypropylene diols and -triols, after the polypropoxylation reaction with ethylene oxide is concluded, are further alkoxylated and as a result have primary hydroxyl groups.

Styrene-acrylonitrile or acrylonitrile-methylmethacrylate-grafted polyether polyols.

Polyester polyols, also called oligoesterols, produced according to known methods, in particular the polycondensation of hydroxycarboxylic acids or the polycondensation of aliphatic and/or aromatic polycarboxylic acids with dihydric or polyhydric alcohols.

Especially suitable as polyester polyols are those that are produced from dihydric to trihydric, for example, dihydric, alcohols, such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-do-decanediol, 1,12-hydroxystearyl alcohol, 1,4-cyclohexanedimethanol, dimer fatty acid diol (dimer diol), hydroxypivalic acid neopentyl glycol ester, glycerol, 1,1,1-trimethylolpropane or mixtures of the above-mentioned alcohols with organic di- or tricarboxylic acids, in particular dicarboxylic acids, or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid and trimellitic acid anhydride or mixtures of the above-mentioned acids, as well as polyester polyols made of lactones, such as, for example, ε-caprolactone and starters such as the above-mentioned divalent or trivalent alcohols.

Especially suitable polyester polyols are polyester diols.

Polycarbonate polyols available by reacting, for example, the above-mentioned alcohols used for the formation of polyester polyols with dialkyl carbonates, diaryl carbonates or phosgene.

Block copolymers carrying at least two hydroxyl-groups that have at least two different blocks with polyether, polyester and/or polycarbonate structures of the above-described type, in particular polyether-polyester polyols.

Polyacrylate and polymethacrylate polyols.

Polyhydroxy-functional fats and oils, for example natural fats and oils, in particular castor oil; or polyols—so-called oleochemical polyols—obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical cross-linking, for example by re-esterification or dimerization of the thus obtained degradation products or derivatives thereof. Suitable degradation products of natural fats and oils are in particular fatty acids and fatty alcohols as well as fatty acid esters, for example, the methyl esters (FAME) that can be derivatized, for example, by hydroformylation and hydrogenation to form hydroxy fatty acid esters.

Polyhydrocarbon polyols, also called oligohydrocarbonols, such as, for example, polyhydroxy-functional polyolefins, polyisobutylenes, polyisoprenes; polyhydroxy-functional ethylene-propylene-, ethylene-butylene- or ethylene-propylene-diene copolymers, as they are produced by, for example, the company Kraton Polymers; polyhydroxy-functional polymers of dienes, for example, of 1,3-butadiene, which can be produced, for example, also by anionic polymerization; polyhydroxy-functional copolymers that include dienes, such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers, as they can be produced from, for example, epoxides or amino alcohols and carboxyl-terminated acrylonitrile/butadiene copolymers (for example commercially available under the names Hypro® (previously Hycar) CTBN and CTBNX and ETBN of Nanoresins AG, or Emerald Performance Materials LLC); as well as hydrogenated polyhydroxy-functional polymers or copolymers of dienes.

Preferably, these above-mentioned polyols have a mean molecular weight of 250 to 30,000 g/mol, in particular of 400-20,000 g/mol, and preferably they have a mean OH-functionality in the range of from 1.6 to 3.

Preferred polyols are polyether, polyester, polycarbonate and polyacrylate polyols, preferably diols and triols.

Especially preferred are polyether polyols, in particular polyoxypropylene and polyoxypropylene-polyoxyethylene polyols, as well as liquid polyester polyols and polyether-polyester polyols.

Moreover, amorphous, partially crystalline and crystalline polyester and polycarbonate diols with a melting point in the range of from 40° C. to 80° C., in particular 50° C. to 70° C., in particular adipic acid/hexanediol polyesters, azelaic acid/hexanediol polyesters, dodecanedicarboxylic acid/hexanediol polyesters and polycarbonate diols on the basis of hexanediol, are especially preferred.

In addition to these mentioned polyols, small amounts of low-molecular, dihydric or polyhydric alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclo-hexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as saccharose, other polyhydric alcohols, low-molecular alkoxylating products of the above-mentioned dihydric and polyhydric alcohols as well as mixtures of the above-mentioned alcohols can be used simultaneously in the production of the polyurethane polymer PUP. Also, small amounts of polyols with a mean OH functionality of more than 3, for example sugar polyols, can be used simultaneously.

Aromatic or aliphatic polyisocyanates, in particular diisocyanates, are used as polyisocyanates for the manufacture of a polyurethane polymer PUP having isocyanate groups.

In particular, monomeric di- or triisocyanates such as 2,4- and 2,6-toluoylene diisocyanate and any mixture of these isomers (TDI), 4,4'-, 2,4'- and 2,2'-diphenylmethane diisocyanate and any mixture of these isomers (MDI), mixtures of MDI and MDI homologs (polymeric MDI or PMDI), 1,3- and 1,4-phenylene diisocyanate, 2,3,5,6-tetramethyl-1,4-diisocyanatobenzene, naphthaline-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane, tris(4-isocyanatophenyl) thiophosphate, oligomers and polymers of the above-mentioned isocyanates and any mixture of the above-mentioned isocyanates are suitable as aromatic polyisocyanates. MDI and TDI are preferred.

Especially suitable aliphatic polyisocyanates are in particular monomeric di- or triisocyanates such as 1,4-tetramethylene diisocyanate, 2-methylpentamethylene-1,5-diisocyanate, 1,6-hexamethylene diisocyanate (HDI), 2,2,4- and 2,4, 4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanatocyclohexane and any mixture of these isomers (HTDI or $H_6$TDI), 1-isocyanato-3,3,5-trimethyl-5-isocyanatomethylcyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl)naphthalene, dimeric and trimeric fatty acid isocyanates, such as 3,6-bis-(9-iso-cyanatononyl)-4,5-di-(1-heptenyl)cyclohexene (dimeryl diisocyanate), α,α,α',α',α'',α''-hexamethyl-1,3,5-mesitylene triisocyanate, oligomers and polymers of the above-mentioned isocyanates, as well as any mixture of the above-mentioned isocyanates. HDI and IPDI are preferred.

Preferably, the polyurethane polymer PUP has a mean molecular weight of 500 g/mol or more. In particular, the polyurethane polymer PUP has a mean molecular weight of from 1000 to 30,000 g/mol, preferably from 2000 to 10,000 g/mol. Moreover, the polyurethane polymer PUP preferably has a mean NCO functionality in the range of from 1.7 to 3, in particular from 1.8 to 2.5.

Preferably, blocked amines BA having only one or two, preferably one blocked amino group in addition to a reactive group R are used for the reaction with the polyurethane polymer PUP containing isocyanate groups.

In the reaction of the polyurethane polymer PUP containing isocyanate groups and the blocked amine BA having at least one blocked amino group and a reactive group R the reactive group R is present stoichiometrically or in stoichiometric excess relative to the isocyanate groups such that the resulting polymeric blocked amine PBA is free from isocyanate groups.

If reactive groups R are present in the form of hydroxyl or mercapto groups, the reaction is preferably carried out at a temperature above room temperature, in particular at a temperature ranging from 50° C. to 100° C., optionally in the presence of a suitable catalyst.

In one embodiment, a polymeric blocked amine PBA1 that contains oxazolidino groups and is free from isocyanate groups, reactive groups R and primary amino groups is used as polymeric blocked amine PBA.

In another embodiment, a preferred polymeric blocked amine PBA is a polymeric blocked amine PBA2 of the formula (XII) that is free from isocyanate groups, reactive groups R and primary amino groups.

Here, Z has the above-mentioned meaning.

The aldimino groups of the formula (XII) are aldimino groups not capable of forming enamines.

In one embodiment, a polymeric blocked amine PBA2 is in particular available by reacting at least one polyurethane polymer PUP having isocyanate groups with at least one aldimine BA2a of the formula (VIII).

In another embodiment, a polymeric blocked amine PBA2 is in particular available by the condensation reaction of at least one polymer having at least two primary amino groups with at least one aldehyde ALD of the formula (XI).

The most preferred polymeric blocked amine PBA2 is a polymeric blocked amine PBA2' that is free from isocyanate groups, reactive groups R and primary amino groups and that has aldimino groups of the formula (XII a).

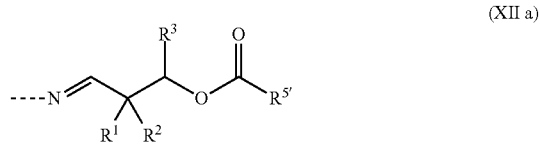

Here, $R^1$, $R^2$, $R^3$ and $R^5$ have the above-mentioned meanings.

Polymeric blocked aldimines PBA2' are advantageous in that they are low in odor or odor-free and that the aldehyde releasable therefrom is also low in odor or odor-free due to its high molecular weight. Provided that the moiety $R^{5'}$ has at least 11 C atoms, they are odor-free and the aldehyde releasable therefrom is also odor-free.

Cured materials having a high extensibility and a high strength can be obtained from curable compositions containing a polymeric blocked amine PBA made of a polyurethane polymer PUP. Such materials are especially suitable as elastic adhesives.

In the present document, a elongation at break of at least 300%, preferably at least 400%, especially preferred at least 450%, measured according to DIN EN 53504, is referred to as "high extensibility". In the present document, a tensile strength of at least 3.0 MPa, preferably at least 4.0 MPa, especially preferred at least 4.5 MPa, measured according to DIN EN 53504, is referred to as "high strength".

In addition to at least one blocked amine BA, the curable composition comprises at least one surface-deactivated polyisocyanate DI that is solid at room temperature.

Preferably, the surface-deactivated polyisocyanate DI exists in a finely divided form, where a substance having a mean particle diameter below 120 µm is designated as "finely divided".

Especially preferred, the mean particle diameter of the surface-deactivated polyisocyanate DI ranges from 0.01 to 100 µm, preferably from 0.1 to 50 µm, especially preferred from 0.3 to 30 µm.

Surface-deactivated polyisocyanates that are solid at room temperature have been known from the prior art, e.g., from EP 0 062 780 A1, EP 0 100 508 A2 and EP 0 153 579 A2.

The surface-deactivated polyisocyanate DI is based on a polyisocyanate that is solid at room temperature and has a melting point distinctly above room temperature. Preferably, the polyisocyanate that is solid at room temperature has a melting point of at least 40° C., preferably at least 80° C., especially preferred at least 120° C.

In particular, the polyisocyanate that is solid at room temperature is selected from the group consisting of naphthalene-1,5-diisocyanate (NDI), 3,3'-dimethyl-4,4'-diisocyanato-diphenyl (TODI, 1,4-phenylene diisocyanate, the isocyanurate of 1-isocyanato-3,3,5-trimethyl-5-isocyanatomethylcyclohexane, the uretdione of 4,4'-diphenylmethane diisocyanate, the uretdione of 2,4-toluoylene diisocyanate and the urea of 2,4-toluoylene diisocyanate. Especially preferred are naphthalene-1,5-diisocyanate (NDI), the uretdione of 2,4-toluoylene diisocyanate and the urea of 2,4-toluoylene diisocyanate.

Preferably, the polyisocyanate that is solid at room temperature exists in a finely divided form with a mean particle diameter ranging from 0.01 to 100 µm, preferably from 0.1 to 50 µm, especially preferred from 0.3 to 30 µm.

A commercially available, finely divided uretdione of 2,4-TDI is, e.g., Addolink® TT (Rhein Chemie).

The surface-deactivated polyisocyanate DI consists of particles of a polyisocyanate that is solid at room temperature, the surface of said particles being covered with a more or less thick layer of a substance that is sufficiently impermeable and resistant at room temperature or slightly elevated temperatures to enclose the isocyanate groups within the particle permanently such that they are rendered inaccessible to chemical reactants, in particular compounds with active hydrogen atoms, hence, to "deactivate" them. When heating the surface-deactivated polyisocyanate DI to a temperature of at least 60° C., in particular at least 80° C., the layer on the polyisocyanate particles is damaged such that the isocyanate particles within the particles are accessible for chemical reactants, hence, they are "activated".

In particular, the surface-deactivated polyisocyanate DI is obtained from the reaction of the surface-deactivated polyisocyanate that is solid at room temperature, on which the surface-deactivated polyisocyanate is based, with a substance having at least one group reactive towards isocyanate groups. A chemical reaction on the surface of the polyisocyanate particles results in the formation of a layer ("protective layer") that is stable, i.e. impermeable and insoluble to a large extent at room temperature or slightly elevated temperatures. A substance that is suitable for this reaction and referred to as "substance for surface deactivation" hereinafter is in particular selected from the group consisting of water, primary and secondary aliphatic amines, amino amides, hydrazines, hydrazides, phenols, carboxylic acids, amindines and guanidines.

Preferred substances for surface deactivation are primary and secondary amines, in particular primary polyamines, in particular the primary amines referred to as amines B2 of the formula (X b) and, moreover, fatty amines, polyalkyleneamines, polyamidoamines and carboxylic acid salts of said amines. The protective layer formed from these substances contains urea groups.

Amines derived from fatty acids and fatty acid mixtures are called fatty amines, such as, for example, laurylamine, myristylamine, palmitinamine, stearylamine, oleylamine, cocoalkylamine, $C_{16}$-$C_{22}$-alkylamine, soyaalkylamine, oleylamine and tallowalkylamine, obtainable, for example, under the trade names Armeen® (from Akzo Nobel) or Rofamin® (from Ecogreen Oleochemicals) and, moreover, diamines obtainable by cyanoethylation and subsequent reduction of fatty amines, such as N-cocoalkyl-1,3-propanediamine, N-oleyl-1,3-propanediamine, N-soyaalkyl-1,3-propanediamine, N-tallowalkyl-1,3-propanediamine or N-($C_{16-22}$-alkyl)-1,3-propanediamine, which can be obtained, for example, as Duomeen® CD, Duomeen® M, Duomeen® O, Duomeen® OV or Duomeen® T (Akzo Nobel), and, moreover, all triamines and tetramines derived from fatty amines, such as cocoalkyldipropylenetriamine, oleyldipropylenetriamine, tallowalkyldipropylenetriamine, oleyltripropylenetetramine and tallowalkyltripropylenetetramine, which can be obtained, for example, as Triameen® C, Triameen® OV, Triameen® T, Tetrameen® OV and Tetrameen® T (Akzo Nobel).

Oligomeric ethyleneamines having portions of secondary amino groups, in particular in the form of technical mixtures, such as, e.g., diethylenetriamine (DETA), triethylenetetramine (TETA), tetraethylenepentamine (TEPA), pentaethylenehexamine (PEHA), are referred to as polyalkyleneamines.

Substances having at least one amido and at least one amino group, in particular reaction products of a mono- or polybasic carboxylic acid or the esters or anhydrides thereof with an aliphatic, cycloaliphatic or aromatic polyamine, the polyamine being used in a stoichiometric excess, are referred to as polyamidoamines. Usually, a so-called dimer fatty acid is used as polybasic carboxylic acid, and a polyalkyleneamine such as, e.g., diethylenetriamine (DETA) or triethylenetriamine (TETA) is usually used as polyamine. Commercially available polyamidoamines are, e.g., Versamid® 100, 125, 140 and 150 (from Cognis), Aradur® 223, 250 and 848 (from Huntsman), Euretek® 505, 510, 514 S, 530, 531, 540, 541, 545, 547, 549, 3607 (from Huntsman) and Beckopox® EH 651, EH 654, EH 655, EH 661 and EH 663 (from Cytec).

Especially preferred substances for surface deactivation are polyoxyalkylenedi- and triamines, in particular Jeffamine® D-230, Jeffamine® D-400 and Jeffamine® T-403 (from Huntsman); and, moreover, short chain aliphatic primary diamines, in particular ethylene diamine, 1,2-propanediamine, 1,3-propanediamine, 1,4-butanediamine and 1,6-hexanediamine; cycloaliphatic primary diamines, in particular bis(4-aminocyclohexyl)methane, bis(4-amino-3-methylcyclohexyl)methane and 1-amino-3-aminomethyl-3,5,5-trimethylcyclohexane; fatty amines, in particular stearylamine and oleylamine; polyalkylene-amines, in particular diethylenetriamine, triethylenetetramine and tetraethylenepentamine; and polyamidoamines, in particular made of dimeric fatty acids and diethylenetriamine or triethylenetetramine.

An especially preferred surface-deactivated polyisocyanate DI is the uretdione of 2,4-TDI that has been surface-deactivated by an amine B2 of the formula (X b), in particular a polyoxyalkylene diamine or triamine.

The substance for surface deactivation to be reacted with the solid polyisocyanate is preferably used in such an amount that from 0.5 to 20, preferably 1 to 15, especially preferred 3 to 12 groups reactive towards isocyanato groups are present per 100 isocyanato groups.

The reaction of the polyisocyanate that is solid at room temperature with the substance for surface deactivation is performed at a temperature below the melting point of the polyisocyanate that is solid at room temperature, preferably at a temperature below 50° C., with the polyisocyanate being dispersed in a liquid medium in which the layer formed on the surface of the polyisocyanate particles is largely insoluble at this temperature. Suitable liquid media are, in particular, softeners, in particular carboxylic acid esters such as phthalates, in particular dioctyl phthalate, diisononyl phthalate or diisodecyl phthalate, adipates, in particular dioctyl adipate, azelates and sebacates, organic phosphoric and sulfonic acid esters or polybutenes. Moreover, the above-mentioned polyols used for the manufacture of a polyurethane polymer PUP are suited as a liquid medium. Moreover, the above-mentioned polymeric blocked amines PBA, in particular the above-mentioned polymeric blocked amines PBA1 and the above-mentioned polymeric blocked amines PBA2 are suited as a liquid medium. Moreover, so-called capped polyols, that is, polyols, the hydroxyl groups of which had been reacted, e.g., to yield ester or in particular ether groups, are suited as a liquid medium. Moreover, polyurethane polymers, the isocyanate groups of which have been reacted, e.g., with monofunctional alcohols, thiols or primary or secondary amines, and, moreover, polymers largely free from isocyanate groups or groups reactive towards isocyanate groups are suited as a liquid medium.

It is possible to treat the polyisocyanate that is solid at room temperature and forms the basis of the surface-deactivated polyisocyanate DI with a second polyisocyanate that is liquid at room temperature before surface deactivation such that this second polyisocyanate wets the surface of the polyisocyanate that is solid at room temperature, and to perform the surface deactivation using the substance for surface deactivation only thereafter. In this manner the surface-deactivating layer is formed from the second polyisocyanate that is liquid at room temperature.

The blocked amine BA and the surface-deactivated polyisocyanate DI are preferably present in the curable composition in such an amount that the ratio between the blocked amino groups and the isocyanate groups is from 0.1 to 1.1, preferably from 0.2 to 1.1, especially preferred from 0.3 to 1.0.

In addition to at least one blocked amine BA and at least one surface-deactivated polyisocyanate DI, the curable composition can contain additional components.

Optionally, the curable composition contains water or a substance generating water, in particular in such an amount that the ratio between the number of water molecules and the number of blocked amino groups is more than 0.25, preferably at least 0.5. Such a composition can be used as a hot-curing composition.

The water can either be present in free form or bonded to a support material. The bonding to a support material that is optionally present is reversible, that is, the water is available for the reaction with the blocked amine BA.

Support materials suited for water are porous materials enclosing water in cavities, in particular diatomaceous earth and molecular sieves. Additional suitable support materials are those taking up water in non-stoichiometric amounts and having a paste-like consistency or those forming gels, e.g., silica gels, clays, polysaccharides or polyacrylic acids that also known under the name "super absorbers" and have been used, e.g., in the manufacture of sanitary articles. Additional suitable support materials are polymers wherein water can be emulsified to form a stable emulsion.

Additional suitable forms of water bonded to a support material are, e.g., hydrates and aqua complexes, in particular inorganic compounds containing water in a coordinatively bonded manner or as crystal water. Examples of hydrates include $Na_2SO_4 \cdot 10H_2O$, $CaSO_4 \cdot 2H_2O$, $CaSO_4 \cdot \frac{1}{2}H_2O$, $Na_2B_4O_7 \cdot 10H_2O$, $MgSO_4 \cdot 7H_2O$. Examples of aqua complexes are the hexaaqua complexes of iron (II), iron (III), cobalt (II), cobalt (III) and nickel (II) and mixed complexes such as $[(H_2O)_4Co(NH_3)_2]^{3+}$ or $[Cl(H_2O)_3Co(NH_3)_2]^{2+}$.

Suitable substances generating water are in particular those substances that generate water when heated to a temperature ranging from 60° C. to 160° C., preferably between 80° C. and 140° C., especially preferred between 90° C. and 130° C. Such substances are in particular boric acid, aluminum hydroxides and silicic acids.

However, the curable composition can also contain only little water or it can be substantially free from water.

Especially in case the blocked amino groups contained in the curable composition are present in the form of enamino groups and/or in the form of ketimino or aldimino groups capable of forming enamines, the curable composition can be used as a hot-curing composition even if it is free from water or contains water in such an amount that the ratio of the number of water molecules to the number of blocked amino groups is 0.25 at the most.

In case the blocked amino groups contained in the curable composition are present in the form of oxazolidino groups or in the form of aldimino groups not capable of forming enamines and the composition is free from water or contains water in such an amount that the ratio of the number of water molecules to the number of blocked amino groups is 0.1 at the most, said composition can be used as heat-activatable composition.

Optionally, the curable composition moreover contains at least one polyol P. Suitable polyols P are the same polyols which have been mentioned as suitable for the manufacture of a polyurethane polymer PUP containing isocyanate groups.

In particular, a composition that can be used as heat-activatable composition optionally contains at least one polyol P.

Moreover, the curable composition contains in particular at least one material that increases the thermal conductivity of the composition and/or, due to its piezoelectric, ferromagnetic or superparamagnetic properties, allows to heat the composition by applying magnetic and/or electric alternating fields, in particular microwaves or induction. This allows to heat the composition, which in general has limited thermal conductivity, more quickly and thus to cure it more quickly. Materials suited for this purpose are in particular graphite, conductive carbon blacks and metal powders; piezoelectric substances such as quartz, tourmaline, barium titanate, lithium sulfate, potassium (sodium) tartrate, ethylene diamine tartrate and lead zirconium titanate; ferromagnetic or superparamagnetic substances such as the metals aluminum, cobalt, iron, nickel and their alloys, metal oxides of the type n-maghemite ($\gamma$-$Fe_2O_3$), n-magnetite ($Fe_3O_4$) and ferrites of the general formula $MFe_2O_4$, where M represents divalent metals from the group of copper, zinc, cobalt, nickel, magnesium, calcium or cadmium. Preferably, this material is very finely divided, with the mean particle diameter being below 120 µm, in particular below 50 µm. In order to take advantage of the superparamagnetic effect, the mean particle diameter is preferably below 50 nm, in particular below 30 nm.

Moreover, the curable composition may contain the auxiliaries and additives usually employed in polyurethane compositions, for example, the following:

softeners, in particular carboxylic acid esters such as phthalates, in particular dioctyl phthalate, diisononyl phthalate or diisodecyl phthalate, adipates, in particular dioctyl adipate, azelates and sebacates, organic phosphoric and sulfonic acid esters or polybutenes;

non-reactive thermoplastic polymers, such as, for example, homo- or copolymers of unsaturated monomers, in particular from the group comprising ethylene, propylene, butylene, isobutylene, isoprene, vinyl acetate and alkyl (meth)acrylates, in particular polyethylenes (PE), polypropylenes (PP), polyisobutylenes, ethylene vinyl acetate copolymers (EVA) and atactic poly-α-olefins (APAO);

solvents;

inorganic and organic fillers, in particular ground or precipitated calcium carbonates, which optionally are coated with fatty acids, in particular stearates, barite ($BaSO_4$, also called heavy spar), quartz flours, calcinated kaolins, aluminum oxides, aluminum hydroxides, silicic acids, in particular highly dispersed silicic acids from pyrolysis processes, carbon blacks, in particular industrially produced carbon blacks (referred to as "carbon black" below), PVC powder or hollow spheres;

fibers, in particular made of polyethylene;

pigments, for example titanium dioxide or iron oxides;

catalysts which accelerate the hydrolysis of the aldimino groups, in particular acids, in particular organic carboxylic acids such as benzoic acid, salicylic acid or 2-nitrobenzoic acid, organic carbocylic acid anhydrides such as phthalic acid anhydride, hexahydrophthalic acid and hexahydromethylphthalic acid anhydride, silyl esters of organic carboxylic acids, organic sulfonic acids such as methanesulfonic acid, p-toluenesulfonic acid or 4-dodecylbenzenesulfonic acid, sulfonic acid esters, other organic or inorganic acids or mixtures of the above-mentioned acids and acid esters;

catalysts accelerating the reaction of the isocyanate groups, in particular organotin compounds such as dibutyltin diacetate, dibutyltin dilaurate, dibutyltin dichloride, dibutyltin acetylacetonate and dioctyltin dilaurate, bismuth compounds such as bismuth trioctoate and bismuth-tris(neodecanoate) and compounds that contain tertiary amino groups, such as 2,2'-dimorpholinodiethyl ether and 1,4-diazabicyclo[2,2,2]octane;

rheology modifiers, in particular thickening agents or thixotropic agents, for example urea compounds, polyamide waxes, bentonites or pyrogenic silicic acids;

desiccants, such as, for example, molecular sieves, calcium oxide, highly reactive isocyanates such as p-tosylisocyanate, monomeric diisocyanates, orthoformic acid esters, alkoxysilanes such as tetraethoxysilane, organoalkoxysilanes such as vinyltrimethoxysilane and organoalkoxysilanes having a functional group in α-position with respect to the silane group.

adhesion promoters, in particular organoalkoxysilanes ("silanes") such as, for example, epoxysilanes, vinylsilanes, (meth)acrylsilanes, isocyanato-silanes, carbamotosilanes, alkylsilanes, S-(alkylcarbonyl)mercaptosilanes and aldiminosilanes and oligomeric forms of these silanes;

stabilizers to protect against heat, light and UV radiation;

flame-retardant substances;

surfactants, in particular wetting agents, flow control agents, deaerating agents or defoaming agents;

biocides, such as, for example, algicides, fungicides or substances that inhibit fungal growth.

When using such additional components of the composition, it can be advantageous to ensure that said components do not greatly impair the shelf life of the composition. If such substances are to be stored together with free isocyanate groups, for example in the case of a heat-activatable composition after the activation thereof, this means in particular that they should not contain water or traces of water at most. It may be advisable to dry certain components chemically or physically before mixing them into the composition.

Preferably, the curable composition contains at least one catalyst. In particular, the catalyst is a metal compound and/or a compound containing tertiary amino groups and/or one of the mentioned acids, such as benzoic acid or salicylic acid.

Preferably, the curable composition additionally contains at least one filler.

Preferably, the curable composition is a one-component composition.

In the present document, a curable composition wherein all components of the composition are stored in the same container in mixed form and which is shelf-stable at room temperature during a period of several weeks up to months, that is, the application or usage properties of which do not alter or alter only very slightly over periods of time by storage, is referred to as "one-component".

In order to cure the curable composition, the surface-deactivated polyisocyanate DI is activated by heating. For this purpose the composition is heated to a temperature ranging from 60° C. to 160° C., preferably from 80° C. to 140° C., especially preferred from 90° C. to 130° C. In this process the protective layer of the surface-deactivated polyisocyanate DI is damaged such that the isocyanate groups thereof are activated and thus become accessible to the hydrolyzed or hydrolyzing blocked amino groups present in the composition. An opening of the uretdione ring of 2,4-TDI uretdione with the release of additional isocyanate groups has not been observed up to a temperature of 130° C.

In particular, the use of the surface-deactivated polyisocyanate DI allows to realize compositions that do not contain free polyisocyanates without the action of heat. Therefore, such compositions have an extremely long shelf life at room temperature. The shelf life can even be increased if the composition is protected not only from heat but also from moisture.

In particular, the curable composition can be used as hot curing adhesive, in particular as elastic hot curing adhesive for industrial applications, e.g., for the assembly of automobiles, transport vehicles and ships and as hot curing reaction resin in SMCs (sheet molding compounds). This will be discussed hereinafter.

Furthermore, the heat-activatable composition can be used as adhesive, sealant or coating, in particular as heat-activatable elastic adhesive and sealant for use in construction and industry, preferably as sealant in the form of expansion joints for buildings or as adhesive for the assembly of automobiles, transport vehicles and ships. This will be discussed hereinafter.

In a preferred embodiment, the curable composition is a hot-curing composition.

In an especially preferred embodiment, it is a hot-curing composition HH comprising
 a') at least one blocked amine BA in the form of a polymeric blocked amine PBA described above;
 b) at least one surface-deactivated polyisocyanate DI that is solid at room temperature; and
 c) optionally water or a substance generating water.

As polymeric blocked amine PBA in the hot-curing composition HH, the polymeric blocked amines PBA1 and the polymeric blocked amines PBA2 are preferred. Especially preferred are the polymeric blocked amines PBA2. Most preferred are the polymeric blocked amines PBA2' that are low in odor or odor-free.

Preferably, the hot-curing composition HH contains water or a substance generating water. Advantageously, the water or the substance generating water is present in such an amount that the ratio between the number of water molecules and the number of blocked amino groups is more than 0.25, preferably at least 0.5.

If the blocked amino groups contained in the hot-curing composition HH are present in the form of enamino groups and/or ketimino or aldimino groups capable of forming enamines, the composition can also cure without water by the action of heat since enamino groups are capable of directly reacting with isocyanate groups without hydrolysis. In this process one or two isocyanate groups per enamino group react without cleavage of the corresponding ketone or aldehyde. In this case, the composition may also contain water in such an amount that the ratio between the number of water molecules and the number of blocked amino groups is at most 0.25. However, curing proceeds faster and at lower temperatures if more water is present.

Advantageously, the hot-curing composition HH contains at least one catalyst. Suitable for this are the above-mentioned catalysts and, moreover, compounds of zinc, manganese, iron, chromium, cobalt, copper, nickel, lead, cadmium, mercury, antimony, vanadium, titanium, zirconium or potassium, such as zinc(II) acetate, zinc(II) 2-ethylhexanoate, zinc(II) laurate, zinc(II) acetylacetonate, iron(III) 2-ethylhexanoate, cobalt(II) 2-ethylhexanoate, copper(II) 2-ethylhexanoate, nickel(II) naphthenate, aluminum lactate, aluminum oleate, diisopropoxytitaniumbis(ethylacetoacetate), potassium acetate; tertiary amines, such as N-ethyldiisopropylamine, N,N,N',N'-tetramethylalkylenediamines, pentamethylalkylenetriamines and higher homologs thereof, bis(N,N-diethylaminoethyl)adipate, tris(3-dimethylaminopropyl)amine, 1,4-diazabicyclo[2,2,2]octane (DABCO), 1,8-diazabicyclo-[5,4,0]undec-7-ene (DBU), 1,5-diazabicyclo[4,3,0]non-5-ene (DBN), N-alkylmorpholines, N,N'-dimethylpiperazine, N-heterocyclic compounds such as 4-dimethylaminopyridine, N-methylimidazole, N-vinylimidazole or 1,2-dimethylimidazole; organic ammonium compounds, in particular tetraalkylammonium carboxylates, halogenides and hydroxides such as tetraalkylammonium acetate and benzyltrimethylammonium hydroxide or alkoxylated tertiary amines; so-called "delayed-action" catalysts which represent modifications of known metal or amine catalysts; as well as combinations of the above-mentioned compounds, in particular of metal compounds and tertiary amines.

The hot-curing composition HH is shelf-stable at room temperature, that is, it can be stored in a suitable packaging or device such as, e.g., a barrel, bucket, bag, cartridge or bottle over periods of several months without altering its applications properties or its properties after curing to an extent that is relevant for its use. Usually, the shelf life can be determined by measuring viscosity or the extrusion force.

The hot-curing composition HH cures by the action of heat. As mentioned above, in this process the protective layer of the surface-deactivated polyisocyanate DI is damaged such that the isocyanate groups thereof are activated and thus become accessible to the hydrolyzed or hydrolyzing blocked amino groups present in the composition, thus initiating curing. Damage of the protective layer of the surface-deactivated polyisocyanate DI is irreversible; therefore the activation of the isocyanate groups continues to exist even after an optional cooling of the composition. Hence, curing takes place even if the composition is heated for a relatively short time. The water required for hydrolyzing the polymeric blocked amines PBA is either advantageously already contained in the composition or generated by the action of heat from the substance generating water.

In the reaction of the isocyanate groups with the hydrolyzing blocked amino groups, a ketone or an aldehyde are released. The reaction of the isocyanate groups with the hydrolyzing blocked amino groups does not necessarily have to proceed via free amino groups, but reactions with intermediate hydrolysis steps are possible as well. Thus, for example, a hydrolyzing aldimino group in the form of a hemiaminal group can react with an isocyanato group. Isocyanate groups that are in excess with respect to the blocked amino groups existing in the hot-curing composition HH react with groups reactive towards isocyanato groups that are optionally present, as well as directly with moisture that is present. As a result of these reactions, the composition cures to form a solid material. This process is also referred to as cross-linking.

Curing of the hot-curing composition HH takes place in the temperature range of from 60° C. to 160° C., preferably from 80° C. to 140° C., especially preferred from 90° C. to 130° C. Under these conditions curing proceeds very fast. Since curing proceeds to a larger extent by the polymeric blocked amine PBA and only to a minor extent by the direct reaction with moisture, the composition substantially cures free from voids.

The heat required for curing of a hot-curing composition can be generated with any energy source. Suitable means for heating are in particular convection ovens, hot-air blowers or infrared radiators. If at least one of the substrates is ferromagnetic and/or the composition contains a piezoelectric, ferromagnetic or superparamagnetic material, heating can also take place by applying alternating magnetic and/or electrical fields, in particular microwaves or induction; this allows an especially quick heating of the hot-curing composition.

Due to the fact that the blocked amine BA in the hot-curing composition HH is present in the form of a polymeric blocked amine PBA, after curing mainly elastic materials having a high extensibility and strength can be obtained, where the mechanical properties are influenced, i.a., by the type of the polyurethane polymer PUP used to produce the polymeric blocked amine PBA1 or PBA2.

If only the polymeric blocked amines PBA2' that are low in odor or odor-free are present in the hot-curing composition HH as polymeric blocked amine PBA and, moreover, no other volatile components are present, only a slight or no odor at all is produced during the curing thereof. Low-odor or odor-free curing is a great advantage, if not a prerequisite, for many applications, in particular in interior spaces.

Above all, the curable composition HH is suited as hot curing adhesive, in particular as hot curing elastic adhesive for industrial applications, e.g., for the assembly of automobiles, transport vehicles and ships and as hot curing reaction resin in SMCs (sheet molding compounds).

In another embodiment, the curable composition is a heat-activatable composition.

In an preferred embodiment, it is a heat-activatable composition HA comprising a") at least one blocked amine BA selected from the group consisting of oxazolidines BA1, aldimines BA2 of the formula (I), polymeric blocked amines PBA1 containing oxazolidino groups and polymeric blocked amines PBA2 containing aldimino groups of the formula (XII) described above;

b) at least one surface-deactivated polyisocyanate DI that is solid at room temperature; and d) optionally at least one polyol P;

wherein the composition HA is free from water or contains water or a substance generating water in such an amount that the ratio between the number of water molecules and the number of blocked amino groups is at most 0.1.

Preferably, the heat-activatable composition HA contains at least one polyol P if either an oxazolidine BA1 or an aldimine BA2 of the formula (I) is present as a blocked amine BA.

Hence, the heat-activatable composition HA preferably contains either at least one oxazolidine BA1 or at least one aldimine BA2 of the formula (I), each in combination with at least one polyol P;
or
at least one polymeric blocked amine PBA1 or at least one polymeric blocked amine PBA2.

With such a heat-activatable composition HA, a predominantly elastic material having a high extensibility and a high strength is formed during curing.

As blocked amine BA in the heat-activatable composition HA, aldimines BA2 of the formula (I) and polymeric blocked amines PBA2 are preferred. Especially preferred are low-odor or odor-free aldimines BA2' and low-odor or odor-free polymeric blocked amines PBA2'.

Most preferably, the heat-activatable composition HA contains either at least one low-odor or odor-free aldimine BA2' in combination with at least one polyol P or at least one low-odor or odor-free polymeric blocked amine PBA2'.

The polyol P is preferably selected from the group consisting of polyether, polyester, polycarbonate and polyacrylate polyols, preferably di- and triols.

Especially preferred as polyol P are polyether polyols, in particular polyoxypropylene and polyoxypropylene-polyoxyethylene polyols, as well as liquid polyester polyols and polyether-polyester polyols.

Moreover, especially preferred as polyol P are amorphous, partially crystalline and crystalline polyester and polycarbonate diols with a melting point in the range of from 40° C. to 80° C., in particular 50° C. to 70° C., in particular adipic acid/hexanediol polyesters, azelaic acid/hexanediol polyesters, do-decanedicarboxylic acid/hexanediol polyesters and polycarbonate diols on the basis of hexanediol.

If the heat-activatable composition HA does not contain a blocked amine PBA, the polyol P is preferably present in such an amount that the ratio between isocyanato groups and hydroxyl groups is between 1.3 and 2.5, preferably between 1.4 and 2.2, especially preferred between 1.5 and 2.1.

After activation of the polyisocyanate DI, the polyol P reacts with the isocyanate groups to form a polyurethane polymer containing isocyanate groups. If the composition contains additional groups reactive towards isocyanato groups, in particular in the blocked amine BA, said groups also react with isocyanate groups. Any isocyanate groups remaining after completion of this reactions and any blocked amino groups are shelf-stable as long as the composition is not contacted with water.

Prior to activation, a heat-activatable composition is extremely shelf-stable at room temperature, that is, it can be stored in a suitable packaging or device such as, e.g., a barrel, bucket, bag, cartridge or bottle over very long periods of time, e.g., for some years, without altering its applications properties or its properties after curing to an extent that is relevant for its use. Usually, the shelf life can be determined by measuring viscosity or the extrusion force. The composition is particularly shelf-stable because, on the one hand, it contains only blocked amino groups that are even stable in combination with free isocyanate groups and, on the other hand, it contains a surface-deactivated polyisocyanate DI instead of free isocyanate. This combination excludes undesired chain extension reactions during storage at room temperature to a very high degree.

Activation of a heat-activatable composition takes place in the temperature range of from 60° C. to 160° C., preferably from 80° C. to 140° C., especially preferred from 90° C. to 130° C. As mentioned above, in this process the protective layer of the surface-deactivated polyisocyanate DI is damaged such that the isocyanate groups thereof are activated and thus become accessible to the hydrolyzed or hydrolyzing blocked amino groups present in the composition. Damage of the protective layer of the surface-deactivated polyisocyanate DI is irreversible; therefore the activation of the isocyanate groups continues to exist even after an optional cooling of the composition. After activation of the surface-deactivated polyisocyanate DI, curing of the heat-activatable composition starts as soon as it contacts moisture.

In a preferred embodiment, activation of the heat-activatable composition HA proceeds prior to the application thereof in a sealed, moisture-proof container, for example, in a sealed cartridge. The activated composition HA remains shelf-stable in the sealed container since, as mentioned above, the present oxazolidino and aldimino groups are shelf-stable in the presence of free isocyanate groups as long as moisture is excluded. The composition HA activated in such a way can be used just as a one-component moisture-curing composition well-known from the prior art.

In another embodiment, activation of the composition is performed when the composition is applied. For this purpose, for example, a reservoir such as, in particular, a barrel or a hobbock can be heated when applying the composition, or the composition can be discharged, for example, through a heated hose.

In another embodiment, activation of the composition is performed only after the application thereof. In particular, such an application is useful if the heat-activatable composition HA does not contain a polyol P and if the composition could take up moisture from the environment in an amount that is sufficient for the hydrolysis of the blocked amino groups.

After activation, the heat-activatable composition HA reacts when contacted with moisture—even at room temperature. The isocyanate groups contained in the composition that have been rendered accessible by activation react with the hydrolyzing oxazolidino and aldimino groups; in this process, a ketone or in particular an aldehyde is released. The reaction of the isocyanate groups with the hydrolyzing blocked amino groups does not necessarily have to proceed via free amino groups, but reactions with intermediate hydrolysis steps are possible as well. Thus, for example, a hydrolyzing aldimino group in the form of a hemiaminal group can react with an isocyanato group. Isocyanate groups that are in excess with respect to the blocked amino groups existing in the hot-curing composition directly react with moisture. As a result of these reactions, the composition cures to form a solid material. This process is also referred to as cross-linking.

If the heat-activatable composition HA contains a combination of at least one oxazolidine BA1 or at least one aldimine BA2 and at least one polyol P, the composition is preferably activated by heat before contacting moisture contained in the air. In this manner the activated isocyanate groups of the surface-deactivated polyisocyanate DI first react with the hydroxyl groups of the polyol P to form a polyurethane polymer containing isocyanate groups, which eventually continues to react when contacted with moisture, in particular with the hydrolyzing blocked amino groups of the oxazolidine BA1 or of the aldimine BA2.

The moisture required for curing can either come from the air (air moisture) or the composition can be contacted with a component containing water, e.g., by brushing, e.g., using a smoothing agent, or by spraying, or, during application, a water-containing component can be added to the composition, e.g., in the form of an aqueous paste, which is mixed in, for example, with a static mixer.

Preferably, the composition is cured using air moisture.

Generally, the heat-activatable composition HA cures without blistering. The curing speed can be controlled by the type and amount of one or several optional catalysts, the temperature existing during curing as well as the air moisture and/or the amount of added water.

The heat-activatable composition HA has a number of advantages.

At room temperature, it is shelf-stable for a practically unlimited period of time. After activation by a heat impulse that is applied before application, it has the application and curing characteristics as well as the final strength of a one-component moisture-curing polyurethane composition known the prior art. In particular, this heat impulse can be applied to the composition packed under moisture-free conditions. Hence, for example, the sealed cartridges, hobbocks or barrels containing the composition can be heated to the temperature required for activating the surface-deactivated polyisocyanates DI and subsequently cooled. The previously heated composition HA contained in the still sealed container has a shelf life of several days up to several weeks and can—as mentioned above—be used just as a one-component moisture-curing composition well-known from the prior art.

If only the polymeric blocked amines PBA2' that are low in odor or odor-free or the polymeric blocked aldimines BA2' that are low in odor or odor-free are used as blocked amines BA, only a slight or no odor at all is produced during curing of the heat-activatable composition HA. Low-odor or odor-free curing is a great advantage, if not a prerequisite, for many applications, in particular in interior spaces.

The heat-activatable composition HA is suitable as a heat-activatable adhesive, sealant or coating, in particular as elastic adhesive and sealant for use in construction and industry, preferably as sealant in the form of expansion joints for buildings or as adhesive for the assembly of automobiles, transport vehicles and ships.

It is especially suitable for applications where very long periods of storage have to be anticipated. For example, this is the case if the composition is shipped over a long distance and/or retailed; moreover, if a product is sold only in small quantities but—for economic reasons—produced and stored in larger quantities. In such applications, the packed material can be activated by heat shortly before being sold to a customer who obtains a material having the usual shelf life despite a longer pre-storage.

Moreover, the heat-activatable composition HA is suitable for applications wherein a one-component moisture-curing composition has to contain an ingredient that—in combination with isocyanate groups—has only a very restricted shelf life. For example, such an ingredient can be a special catalyst, a special flame retardant or any other substance that confers a desired property to the composition. Due to the presence of such a substance in a heat-activatable composition HA containing the surface-deactivated polyisocyanate DI, this composition is shelf-stable for a very long period of time. It can be activated by the customer prior to use and then—depending on the type of the used substance—still has a limited shelf life of, e.g., several hours to weeks.

Another aspect of the present invention pertains to a first process for bonding a substrate S1 to a substrate S2 comprising the steps of:

i) applying a hot-curing composition to a substrate S1;
ii) contacting the applied composition with a substrate S2;
or
i') applying a hot-curing composition to a substrate S1 and a substrate S2;
ii') contacting the applied composition with each other;
and, subsequently,
iii) heating the applied composition by a suitable method to a temperature of from 60° C. to 160° C., preferably from 80° C. to 140° C., especially preferred from 90° C. to 130° C.;
wherein the substrate S2 is formed of the same or a different material than the substrate S1.

The composition is cured by heating according to step iii).

The application of the hot-curing composition preferably takes place at room temperature or a slightly higher temperature, in particular below a temperature of 50° C.

Another aspect of the present invention pertains to another process for bonding a substrate S1 to a substrate S2 comprising the steps of:

α) heating a heat-activatable composition by a suitable method to a temperature of from 60° C. to 160° C., preferably from 80° C. to 140° C., especially preferred from 90° C. to 130° C.; subsequently
either
β) applying the composition heated in step α) to a substrate S1;
γ) contacting the applied composition with a substrate S2 within the open time of the composition;
or
β') applying the composition heated in step α) to a substrate S1 and to a substrate S2;
γ') contacting the applied composition with each other within the open time of the composition;
wherein a period of several minutes to some days or several weeks may elapse between heating and applying the heat-activatable composition; and wherein the substrate S2 is formed of the same or a different material than the substrate S1.

In this document, the time in which the previously heated composition HA can be processed after contacting the composition with moisture is referred to as "open time".

Another aspect of the present invention pertains to a process for sealing. Said process comprises the steps of:

α) heating a heat-activatable composition by a suitable method to a temperature of from 60° C. to 160° C., preferably from 80° C. to 140° C., especially preferred from 90° C. to 130° C.;
β") applying the composition heated in the previous step between a substrate S1 and a substrate S2 such that the composition contacts substrate S1 and substrate S2;
wherein a period of several minutes to some days or several weeks may elapse between heating and applying the heat-activatable composition;
and wherein the substrate S2 is formed of the same or a different material than the substrate S1.

Usually the sealant is pressed in a so-called joint.

Another aspect of the present invention pertains to a process for coating a substrate S1. Said process comprises the steps of:

α) heating a heat-activatable composition by a suitable method to a temperature of from 60° C. to 160° C., preferably from 80° C. to 140° C., especially preferred from 90° C. to 130° C.;

β''') applying the composition heated in the previous step to a substrate S1 within the open time of the composition; wherein a period of several minutes to some days or several weeks may elapse between heating and applying the heat-activatable composition.

The application of the previously heated composition can take place at room temperature, but also at higher or lower temperatures.

In these described processes, suitable substrates S1 and/or S2 are in particular glass, glass ceramic, concrete, mortar, brick, adobe, gypsum and natural stones, such as granite or marble;

metals or alloys such as aluminum, steel, iron, non-ferrous metals, galvanized metals;

leather, textiles, paper, wood, resin-bonded wood-based materials, resin-textile composites and other so-called polymer composites;

plastics such as polyvinyl chloride (hard and soft PVC), acrylonitrile-butadiene-styrene copolymers (ABS), SMC (sheet molding compounds), polycarbonate (PC), polyamide (PA), polyesters, poly(methylmethacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), where the plastics can preferably be surface-treated, for example, by plasma, corona or flame;

coated substrates such as powder-coated metals or alloys; as well as paints and varnishes.

If necessary, the substrates can be pretreated before the application of the composition. Such pretreatments comprise, in particular, physical and/or chemical cleaning methods, for example grinding, sandblasting, brushing or the like or treatment with cleaning agents or solvents or the application of an adhesion promoter, an adhesion-promoting solution or a primer.

An article can be produced from these described processes for gluing, sealing or coating or from the use of one of the described compositions as an adhesive, sealant or coating.

In particular, this article can be a building, for example, a building that is above or below ground level, or an industrial item or a consumer item, for example, a window, a household appliance or a means of transport, for example, a vehicle for water or land, preferably an automobile, a bus, a truck, a train or a boat, or an accessory of a means of transport, or an article of the furniture, textile or packaging industries.

If the curable composition is used as adhesive for elastic bonds in vehicle manufacturing, it has preferably a pasty consistency with structurally viscous properties. Such an adhesive is applied to the substrate by means of a suitable device, preferably in the form of a bead having a substantially round or triangular cross-sectional area. Suitable methods for applying the adhesive are, for example, the application from commercially available cartridges which can be operated manually or by compressed air, or from a barrel or hobbock by means of a feed pump or an extruder, optionally by means of an application robot. An adhesive with good application properties has a high stability under load and a low stringiness. That means that it remains in the applied form after application, that is, it does not flow and does not draw a thread or only a very short thread, thus avoiding soiling of the substrate.

In vehicle manufacturing, elastic bonds are made by, e.g., bonding parts such as plastic covers, trims, flanges, bumpers, driver's cabs or other attachments to the painted body of a means of transport or the bonding of panes to the body. As vehicles, automobiles, trucks, buses, rail vehicles and ships are mentioned.

EXAMPLES

"Standard climate" is defined as a temperature of 23±1° C. and a relative air humidity of 50±5%.

Used starting materials:

| | |
|---|---|
| Acclaim ® 4200 N | Polyoxypropylene diol, hydroxyl value 28.5 mg KOH/g; Bayer |
| Caradol ® MD34-02 | Polyoxypropylene polyoxyethylene triol, hydroxyl value 35 mg KOH/g; Shell |
| Desmophen ® 4011T | Polyoxypropylene triol, hydroxyl value 550 mg KOH/g; Bayer |
| Acclaim ® 12200 | Polyoxypropylene diol, hydroxyl value 12.0 mg KOH/g; Bayer |
| Jeffamine ® D-230 | Polyoxypropylene diamine, mean molecular weight approx. 240 g/mol, amine content 8.29 mmol N/g; Huntsman |
| Jeffamine ® D-400 | Polyoxypropylene diamine, mean molecular weight approx. 450 g/mol, amine content 4.42 mmol N/g; Huntsman |
| Jeffamine ® T-5000 | Polyoxypropylene triamine, mean molecular weight approx. 5000 g/mol, amine content 0.535 mmol N/g; Huntsman |
| Desmodur ® 44 MC L | 4,4'-Methylenediphenyl diisocyanate; Bayer |
| Palatinol ® Z | Diisodecyl phthalate (DIDP); BASF |

1. Description of the Measuring Methods

The amine content, i.e., the total content of blocked (aldimino groups) and free amino groups in the produced compounds was determined titrimetrically (with 0.1 N $HClO_4$ in glacial acetic acid, against crystal violet), and is always indicated in mmol N/g 2. Production of Blocked Amines Aldimine A-1

280 g of 2,2-dimethyl-3-lauroyloxypropanal was introduced under nitrogen atmosphere into a round-bottom flask. 100 g of 2-(2-amino-ethoxy)ethanol (DGA; Diglycolamine® Agent, Huntsman; amine content 9.46 mmol N/g) was added from a dropping funnel with vigorous stirring. Then, the volatile compounds were removed under vacuum (10 mbar, 80° C.). Yield: 360 g of a colorless liquid that is low-viscous, clear and odor-free at room temperature and has an amine content of 2.58 mmol N/g.

Aldimine A-2

743 g of distilled 2,2-dimethyl-3-lauroyloxypropanal was introduced under nitrogen atmosphere into a round-bottom flask. 300 g of Jeffamine® D-230 was slowly added from a dropping funnel with vigorous stirring. Then, the volatile compounds were removed under vacuum (10 mbar, 80° C.). Yield: 995 g of a clear, pale yellowish liquid with an amine content of 2.50 mmol N/g.

Aldimine A-3

550 g of distilled 2,2-dimethyl-3-lauroyloxypropanal was introduced under nitrogen atmosphere into a round-bottom flask. 156 g of 1-amino-3-aminomethyl-3,5,5-trimethylcyclohexane (=isophoronediamine, IPDA; Vestamin® IPD, Degussa; amine content 11.68 mmol N/g) was added from a dropping funnel with vigorous stirring. Then, the volatile compounds were removed under vacuum (10 mbar, 80° C.). Yield: 671 g of a clear, colorless liquid with an amine content of 2.73 mmol N/g.

Ketimine A-4

105 g of 2-(2-aminoethoxy)ethanol (Diglycolamine® Agent; Huntsman), 120 g of 4-methyl-2-pentanone and 100 ml of methylcyclohexane were introduced into a round-bottom flask with water separator and stirrer, and the mixture was refluxed until the calculated amount of water was separated. Then, the volatile compounds of the reaction mixture were largely removed under vacuum (10 mbar, 100° C.). Yield: 193 g of a pale yellowish, clear liquid with an amine content of 5.17 mmol N/g.

Oxazolidine A-5

20.00 g of diethanolamine, 15.10 g of isobutyraldehyde and 100 ml of cyclohexane were introduced into a round-bottom flask with water separator and stirrer, and the mixture was refluxed until the calculated amount of water was separated. Then, the volatile compounds of the reaction mixture were removed under vacuum (10 mbar, 70° C.). Yield: 30.8 g of a colorless, clear liquid with an amine content of 6.33 mmol N/g.

3. Production of Polymeric Blocked Amines

Polymer AP-1

400 g of Acclaim® 4200 N and 52 g of Desmodur® 44 MC L were reacted according to the known process at 80° C. to yield an NCO-terminated polyurethane polymer having a content of free isocyanate groups of 1.90 wt %. 80 g of aldimine A-1 was stirred in this polyurethane polymer and kept at 60° C. until the NCO band (at approx. 2270 cm$^{-1}$) could no longer be detected in the FT IR spectrum (after approx. 12 hours). The resulting polymer containing aldimino groups had a viscosity at 20° C. of about 100 Pa·s.

Polymer AP-2

130 g of Acclaim® 4200 N, 260 g of Caradol® MD34-02, 60 g of Desmodur® 44 MC L and 50 g of Palatinol® Z were reacted according to the known process at 80° C. to yield an NCO-terminated polyurethane polymer having a content of free isocyanate groups of 2.05 wt %. 95 g of aldimine A-1 was stirred in this polyurethane polymer and kept at 60° C. until the NCO band could no longer be detected in the FT IR spectrum (after approx. 12 hours). The resulting polymer containing aldimino groups had a viscosity at 20° C. of about 100 Pa·s.

Polymer AP-3

100 g of Acclaim® 4200 N, 200 g of Caradol® MD34-02 and 30 g of toluoylene diisocyanate (TDI; Desmodur® T 80 P, Bayer) were reacted according to the known process at 80° C. to yield an NCO-terminated polyurethane polymer having a content of free isocyanate groups of 2.04 wt %. 62 g of aldimine A-1 was stirred in this polyurethane polymer and kept at 60° C. until the NCO band could no longer be detected in the FT IR spectrum (after approx. 24 hours). The resulting polymer containing aldimino groups had a viscosity at 20° C. of about 60 Pa·s.

Polymer AP-4

Polymer AP-4 was produced in the same manner as polymer AP-1, except that 40 g of ketimine A-4 was used instead of 80 g of aldimine A-1. The resulting ketimine-terminated polyurethane polymer had a viscosity at 20° C. of about 350 Pa·s.

Polymer AP-5

Polymer AP-5 was produced in the same manner as polymer AP-1, except that 32.5 g of oxazolidine A-5 was used instead of 80 g of aldimine A-1. The resulting oxazolidine-terminated polyurethane polymer had a viscosity at 20° C. of about 250 Pa·s.

4. Production of the Surface-Deactivated Polyisocyanate

Isocyanate paste DI-1

In a dispersing tool, 40 g of finely divided dimeric 2,4-toluoylene diisocyanate (Addolink® TT, RheinChemie; particle size about 5-50 µm, NCO content 24.0%) was dispersed in 55 g of Palatinol® Z. 5 g of Jeffamine® D-400 was added to this, and the mixture was processed by dispersing to give a fine paste.

5. Production of Heat-Curing Adhesives

Examples 1 to 8 and Comparative Example 9

In a vacuum mixer, the ingredients indicated in percentage by weight in table 1 were processed under exclusion of moisture to give a lump-free, homogeneous paste which was immediately filled into an inside painted aluminum cartridge, and the cartridge was hermetically sealed.

The thixotropic paste was produced as follows:

3000 g of Palatinol® Z and 480 g of Desmodur® 44 MC L were added to a vacuum mixer and slightly heated. Subsequently, 270 g of monobutylamine was slowly added dropwise with vigorous stirring. The resulting paste was further stirred under vacuum and cooled for one hour.

The aqueous paste was produced as follows:

40 g of Acclaim® 4200 N and 5.2 g of Desmodur® 44 MC L were reacted according to the known process at 80° C. to yield an NCO-terminated polyurethane polymer having a content of free isocyanate groups of 1.90 wt %. After cooling, 10.76 g of aldimine A-2, 0.2 g of salicylic acid solution (5 wt % in dioctyl adipate) and 56.0 g of polyethylene glycol dibutyl ether (Polyglycol BB 300, Clariant; mean molecular weight 300 g/mol) were homogeneously mixed and heated to 60° C. 47.38 g of water was added, and the mixture was stirred at 60° C. for 20 minutes. A milky white, low-viscous emulsion was obtained. In a vacuum mixer, said emulsion was mixed with 1.9 g of technical-grade sodium dodecylbenzene sulfonate (Rhodacal® DS-10, Rhodia), 1.9 g of sodium tallate (Dresinate® TX, Eastman), 0.9 g of triethylamine, 14.1 g of polyethylene glycol dibutyl ether (Polyglycol BB 300, Clariant; mean molecular weight 300), 9.4 g of hydrophilic pyrogenic silicic acid (Aerosil® 200, Degussa) and 9.4 g of hydrophobic pyrogenic silicic acid (Aerosil® R972, Degussa) to form a creamy paste with a water content of 23.9 wt %.

TABLE 1

Composition of the hot-curing adhesives

| | Example | | | | | | | | |
|---|---|---|---|---|---|---|---|---|---|
| | 1 | 2 | 3 | 4 | 5 | 6 | 7 | 8 | 9 (Comp.) |
| Polymer AP-1 | 50.0 | — | — | — | — | 50.0 | 50.0 | 40.0 | — |
| Polymer AP-2 | — | 50.0 | — | — | — | — | — | — | — |
| Polymer AP-3 | — | — | 50.0 | — | — | — | — | — | — |

TABLE 1-continued

Composition of the hot-curing adhesives

| | Example | | | | | | | | |
|---|---|---|---|---|---|---|---|---|---|
| | 1 | 2 | 3 | 4 | 5 | 6 | 7 | 8 | 9 (Comp.) |
| Polymer AP-4 | — | — | — | 50.0 | — | — | — | — | — |
| Polymer AP-5 | — | — | — | — | 50.0 | — | — | — | — |
| Jeffamine ® T-5000 | — | — | — | — | — | — | — | — | 30.0 |
| Caradol ® MD34-02 | — | — | — | — | — | — | — | 20.0 | 20.0 |
| Isocyanate paste DI-1 | 10.0 | 10.8 | 10.8 | 10.8 | 15.0 | 10.0 | 10.0 | 14.5 | 14.9 |
| Palatinol ® Z | 12.9 | 12.1 | 12.1 | 12.1 | 10.9 | — | 12.9 | — | 12.0 |
| Kaolin | 23.0 | 23.0 | 23.0 | 23.0 | 20.0 | 15.9 | 13.0 | 23.0 | 23.0 |
| Thixotropic paste | — | — | — | — | — | 20.0 | — | — | — |
| Carbon black | — | — | — | — | — | — | 10.0 | — | — |
| Aqueous paste | 2.0 | 2.0 | 2.0 | 2.0 | 2.0 | 2.0 | 2.0 | 1.4 | — |
| Salicylic acid[a] | 2.0 | 2.0 | 2.0 | 2.0 | 2.0 | 2.0 | 2.0 | 1.0 | — |
| Dibutyl tin dilaurate[a] | 0.1 | 0.1 | 0.1 | 0.1 | 0.1 | 0.1 | 0.1 | 0.1 | 0.1 |

[a] 5 wt % in dioctyl adipate.

The so-obtained hot-curing adhesives were tested as described hereinafter:

In order to determine the shelf life, the adhesives were stored within the sealed cartridge in an oven at 40° C. and the time in which the viscosity doubled was measured.

In order to assess the curing properties, the adhesive was investigated by means of differential scanning calorimetry (DSC), wherein the maximum of the exothermic peak ("DSC maximum") in the measured heating curve (temperature range from 25 to 180° C.; heating rate 10° C./min) was determined. For this purpose a DSC 822$^e$ from Mettler Toledo was used.

In order to determine the mechanical properties after curing, the adhesive applied to a PTFE coated foil was pressed in a heatable press to a film about 2 mm thick and this film was heated to 90° C. for 10 minutes. The mechanical properties of the so-obtained cured film were tested either directly ("without post-cure") or after an additional 24 hour storage under standard climate ("with post-cure") by die-cutting some dumbbell-test pieces having a length of 75 mm, a land length or 30 mm and a land width of 4 mm and testing said test pieces according to DIN EN 53504 at a tensile speed of 200 mm/min for tensile strength (breaking load), elongation at break and modulus of elasticity (recorded at 0-50% strain).

Moreover, qualitative tests for determining blistering by means of a visual inspection of the cured adhesive and the odor during and just after curing were made.

The results are illustrated in table 2.

TABLE 2

Properties of the hot-curing adhesives.

| | Example | | | | | | | | |
|---|---|---|---|---|---|---|---|---|---|
| | 1 | 2 | 3 | 4 | 5 | 6 | 7 | 8 | 9 (Comp.) |
| Shelf life | >28 d | >28 d | >28 d | >28 d | >28 d | >28 d | >28 d | >28 d | >28 d |
| DSC maximum | 82° C. | 75° C. | 79° C. | 70° C., 117° C. | 70° C., 117° C. | 76° C. | 77° C. | 77° C. | 92° C. |
| Blistering | None | None | None | None | Some | None | None | None | None |
| Odor | None | None | None | None | Strong | Strong | None | None | None |
| Mechanical properties without post-cure: | | | | | | | | | |
| Tensile strength (MPa) | 5.6 | 5.0 | 4.9 | N.m. | 4.8 | 4.4 | 4.6 | 2.9 | 3.0 |
| Elongation at break (%) | 460 | 300 | 380 | N.m. | 250 | 590 | 440 | 450 | 290 |
| Modulus of elasticity (MPa) | 3.7 | 4.0 | 4.0 | N.m. | 2.1 | 3.7 | 3.0 | 2.3 | 3.1 |
| Mechanical properties with post-cure: | | | | | | | | | |
| Tensile strength (MPa) | 5.8 | 5.2 | 5.1 | N.m. | 5.0 | 4.5 | 4.7 | 3.0 | 3.0 |
| Elongation at break (%) | 480 | 320 | 390 | N.m. | 220 | 600 | 450 | 460 | 270 |
| Modulus of elasticity (MPa) | 3.8 | 4.2 | 4.1 | N.m. | 2.4 | 3.7 | 3.1 | 2.2 | 3.2 |

N.m. = not measurable (blisters)

It can be seen from Table 2 that the hot-curing adhesives of examples 1 to 8 according to the invention cure quickly and completely and, with the exception of one, without blistering under the conditions used. They have different mechanical properties in the cured state. Depending on the type of the used blocked amine, high strengths and strains can be attained, in particular with polymers AP-1, AP-2 and AP-3. During curing, the adhesives of examples 4 and 5 smell strongly of 4-methyl-2-pentanone and isobutyric aldehyde, respectively. During curing, blisters formed in the adhesive of example 4. Presumably, blistering was caused by the release of 4-methyl-2-pentanone which evaporates during heating. The hot-curing adhesive of comparative example 9 does not contain blocked amino groups as a component reactive towards isocyanato groups but a combination of a polyoxypropylene triamine and a polyoxypropylene polyoxyethylene triol that is known from the prior art. Although it cures fast and without blistering as well, its mechanical properties tend to be inferior.

Moreover, the hot-curing adhesive of example 1 was tested for development of strength as a function of temperature and heating time. For this purpose the adhesive was heated as a film at different temperatures for different times ("curing conditions"). The so-obtained cured film was tested for its mechanical properties and blistering immediately and without post-cure as described above.

The results are illustrated in table 3.

plate); the glass was pretreated with Sika® Activator (obtainable from Sika Schweiz AG) and the activator was allowed to dry for 10 minutes. Each of the adhesives was applied to the substrates as a triangular bead with a diameter of about 1 cm, the bead was covered with a LDPE strip and slightly pressed by exerting pressure on the strip. In order to cure the adhesive, the substrate covered with adhesive was subsequently placed in a convection oven at 100° C. for 10 minutes before storing it under standard climate for 7 days. Thereafter, adhesion was tested using the "bead test". For this, the bead is cut at the end just above the adhesive surface. The cut end of the bead is held with round-tip forceps and pulled from the substrate surface. This is done by carefully rolling up the bead on the tip of the forceps and placing a cut perpendicular to the direction in which the bead is pulled, down to the bare substrate surface. The bead peel rate should be selected such that a cut must be made approximately every 3 seconds (distance between cuts about 2 to 3 mm). The test distance must be at least 8 cm.

The adhesive properties are assessed on the basis of the adhesive remaining on the surface after pulling off the bead (cohesive failure), namely, by estimating the cohesive portion of the bonding surface. In this method, a fracture pattern with a cohesive failure exceeding 95% is rated "excellent". The results are illustrated in table 4.

TABLE 3

Development of strength of the hot-curing adhesive of example 1 as a function of temperature and heating time.

| | Curing conditions | | | | | |
|---|---|---|---|---|---|---|
| | 80° C., 2 min | 80° C., 5 min | 90° C., 2 min | 90° C., 5 min | 90° C., 10 min | 90° C., 20 min |
| Blistering | None | None | None | None | None | None |
| Tensile strength [MPa] | 1.6 | 3.9 | 4.9 | 5.0 | 5.0 | 5.7 |
| Elongation at break [%] | 60 | 220 | 300 | 350 | 360 | 490 |
| Modulus of elasticity [MPa] | n.d. | 3.5 | 3.6 | 3.6 | 3.5 | 3.6 |

| | Curing conditions | | | | | |
|---|---|---|---|---|---|---|
| | 100° C., 1 min | 100° C., 2 min | 120° C., 0.5 min | 120° C., 1 min | 140° C., 0.5 min | 160° C., 0.5 min |
| Blistering | None | None | None | None | Slight | Marked |
| Tensile strength [MPa] | 5.0 | 5.1 | 4.8 | 4.2 | 4.3 | 3.4 |
| Elongation at break [%] | 320 | 320 | 260 | 250 | 250 | 240 |
| Modulus of elasticity [MPa] | 3.8 | 3.9 | 3.7 | 3.6 | 3.5 | 2.9 | n.d. = not determined

It can be seen from table 3 that the hot-curing adhesive of example 1 cures very fast at temperatures of 90° C. and 100° C. to give an elastic material with good mechanical properties. Curing takes much longer at 80° C., whereas somewhat lower values of the mechanical properties are obtained at higher temperatures, whereas slight blistering is observed at temperatures exceeding 140° C.

In addition, the hot-curing adhesives of examples 6 and 7 were tested for adhesion to substrates of glass (flat glass, air side) and cathode dip-coated steel (cathode dip-coated steel

TABLE 4

Adhesion of the hot-curing adhesives of examples 6 and 7.

| | Substrate | |
|---|---|---|
| | Cathode dip-coated steel | Glass (with pretreatment) |
| Example 6 | Excellent | Excellent |
| Example 7 | Excellent | Excellent |

Examples 10 to 16

In a vacuum mixer, the ingredients indicated in percentage by weight in table 5 were processed under exclusion of moisture until a lump-free, homogeneous paste was obtained which was immediately filled into an inside painted aluminum cartridge, and the cartridge was hermetically sealed. The thixotropic paste was produced as described in example 1.

TABLE 5

Composition of the adhesives of examples 10 to 16.

| | Example | | | | | | |
|---|---|---|---|---|---|---|---|
| | 10 | 11 | 12 | 13 | 14 | 15 | 16 |
| Polymer AP-4 | 50.0 | 50.0 | 50.0 | 50.0 | 50.0 | 50.0 | 50.0 |
| Isocyanate paste DI-1 | 10.0 | 15.0 | 20.0 | 10.0 | 20.0 | 10.0 | 10.0 |
| Palatinol ® Z | 14.0 | 9.0 | 4.0 | 14.0 | 4.0 | — | 14.0 |
| Thixotropic paste | — | — | — | — | — | 20.0 | — |
| Kaolin | 25.0 | 25.0 | 25.0 | 25.0 | 25.0 | 19.0 | 15.0 |
| Carbon black | — | — | — | — | — | — | 10.0 |
| Salicylic acid[a] | 1.0 | 1.0 | 1.0 | — | — | 1.0 | 1.0 |
| DABCO ® 33-LV[b] | — | — | — | 1.0 | 1.0 | — | — |

[a] 5 wt % in dioctyl adipate.
[b] from Air Products.

The so-obtained adhesives were tested as described in example 1 except that the adhesive film was cured by heating it in the press for 5 minutes at 120° C. and the mechanical properties were measured without post-cure. The results are illustrated in table 6.

TABLE 6

Properties of the adhesives of examples 10 to 16.

| | Example | | | | | | |
|---|---|---|---|---|---|---|---|
| | 10 | 11 | 12 | 13 | 14 | 15 | 16 |
| Shelf life | >28 d | >28 d | >28 d | >28 d | >28 d | >28 d | >28 d |
| DSC maximum | 121° C. | 115° C. | 118° C. | 113° C. | 120° C. | 124° C. | 127° C. |
| Blistering | None | None | None | None | None | None | None |
| Tensile strength [MPa] | 5.6 | 6.4 | 8.0 | 3.1 | 6.1 | 4.9 | 6.5 |
| Elongation at break [%] | 270 | 240 | 270 | 270 | 150 | 320 | 310 |
| Modulus of elasticity [MPa] | 3.0 | 4.5 | 5.3 | 1.5 | 5.5 | 3.6 | 2.7 |

It can be seen from table 6 that the hot-curing adhesives of examples 10 to 16 also cure without added water. Presumably, when heated the enamine form of the ketimino groups of polymer AP-4 reacts with the activated polyisocyanate DI without being hydrolyzed. An indication of this curing type is the fact that, for example, the adhesive of example 12 has a higher strength than the adhesive of example 10 although, based on the isocyanate groups of the surface-deactivated polyisocyanate DI, it contains only half as many ketimino groups than example 10. Apparently, the enamine form of the ketimino groups reacted with two activated isocyanate groups, thus increasing cross-linking. The fact that no bubbles were formed during curing of the adhesives shows that, apparently, hardly any 4-methyl-2-pentanone was cleaved off, which also supports a reaction of the enamine form of the ketimine. Moreover, it can be seen from table 6 that these adhesives cure both with acid and tertiary amine as catalyst, which, in the case of acid as catalyst, results in cured adhesives with higher strengths.

6. Production of Heat-Activatable Moisture-Curing Adhesives

Examples 17 to 22 and Comparative Example 23

In a vacuum mixer, the ingredients indicated in percentage by weight in table 7 were processed under exclusion of moisture to give a lump-free, homogeneous paste (maximum temperature during mixing=50° C.) which was immediately filled into an inside painted aluminum cartridge, and the cartridge was hermetically sealed. The thixotropic paste was produced as described in example 1.

TABLE 7

Composition of the heat-activatable adhesives.

| | Example | | | | | | |
|---|---|---|---|---|---|---|---|
| | 17 | 18 | 19 | 20 | 21 | 22 | 23 (Comp.) |
| Polymer AP-1 | 50.0 | 40.0 | — | — | — | — | — |
| Aldimine A-3 | — | — | 4.0 | 4.0 | 1.5 | 2.5 | — |
| Desmophen ® 4011 T | — | — | — | — | — | 0.4 | — |
| Caradol ® MD34-02 | — | — | 24.0 | 18.0 | 5.0 | — | 18.0 |
| Acclaim ® 4200 | — | — | 12.0 | 9.0 | — | — | 9.0 |
| Acclaim ® 12200 | — | — | — | — | 20.0 | 40.0 | — |
| Isocyanate paste DI-1 | 10.0 | 8.0 | 20.0 | 15.0 | 7.0 | 12.5 | 15.0 |

TABLE 7-continued

Composition of the heat-activatable adhesives.

| | Example | | | | | | |
|---|---|---|---|---|---|---|---|
| | 17 | 18 | 19 | 20 | 21 | 22 | 23 (Comp.) |
| Palatinol ® Z | 12.9 | 19.9 | 12.9 | 9.9 | — | 5.4 | 14.8 |
| Thixotropic paste | — | — | — | 12.0 | 26.3 | 12.0 | 14.0 |
| Kaolin | 25.0 | 20.0 | 25.0 | 25.0 | — | 25.0 | 27.0 |
| Carbon black | — | 10.0 | — | 5.0 | — | — | — |
| Chalk | — | — | — | — | 38.0 | — | — |
| Salicylic acid[a] | 2.0 | 2.0 | 2.0 | 2.0 | 2.0 | 2.0 | 2.0 |
| Dibutyl tin dilaurate[a] | 0.1 | 0.1 | 0.1 | 0.1 | 0.2 | 0.2 | 0.2 |

[a] 5 wt % in dioctyl adipate.

The so-obtained heat-activatable moisture-curing adhesives were tested as follows.

In order to characterize the activation temperature, the DSC maximum was determined as described in example 1.

In order to determine the mechanic properties after curing, the adhesive was first activated by heating in a cartridge oven for 30 minutes at 110° C. Then, the adhesive was allowed to cool to room temperature, applied to a PTFE-coated foil with a caulking gun and pressed to a film having a thickness of about 2 mm. After allowing the film to cure under standard climate for 5 days, its tensile strength, elongation at break and modulus of elasticity were determined as described in example 1.

Shelf life, blistering and odor were determined as described in example 1.

The results are illustrated in table 8.

TABLE 8

Properties of the heat-activatable adhesives.

| | Example | | | | | | |
|---|---|---|---|---|---|---|---|
| | 17 | 18 | 19 | 20 | 21 | 22 | 23 (Comp.) |
| Shelf life | >28 d | >28 d | >28 d | >28 d | >28 d | >28 d | >28 d |
| DSC maximum | 74° C. | 71° C. | 79° C. | 85° C. | 83° C. | 76° C. | 90° C. |
| Blistering | None | None | None | None | None | None | Yes |
| Odor | None | None | None | None | None | None | None |
| Tensile strength [MPa] | 6.3 | 3.7 | 4.4 | 3.7 | 1.9 | 2.5 | N.m. |
| Elongation at break [%] | 640 | 310 | 270 | 240 | 190 | 280 | N.m. |
| Modulus of elasticity [MPa] | 4.2 | 4.1 | 4.1 | 3.8 | 2.4 | 2.0 | N.m. |

N.m. = not measurable (many blisters)

It can be seen from table 8 that the adhesives according to the invention of examples 17 to 22 cured to form elastic films after heat activation and subsequent cooling under standard climate. However, comparative example 23 which did not contain a blocked amine, formed a film containing many blisters when curing.

In another series of tests, the adhesive of example 17 was cured such that the heat activation was performed just after the application of the adhesive. In this series the duration of the action of heat was varied and the development of strength as a function of activation time was investigated. In each case, the adhesive was applied to a PTFE coated foil and pressed in a heatable press to a film about 2 mm thick and this film was heated to 100° C. for various periods. Subsequently, the so-obtained film was kept under standard climate for 5 days before testing the mechanical properties as described in example 1. The results are illustrated in table 9.

TABLE 9

Development of strength of the adhesive of example 17 as a function of activation time.

| | Activation time | | | | |
|---|---|---|---|---|---|
| | 0 min | 1 min | 5 min | 10 min | 20 min |
| Blistering | None | None | None | None | None |
| Tensile strength [MPa] | N.m. | 5.6 | 6.5 | 6.3 | 6.0 |
| Elongation at break [%] | (no curing) | 460 | 660 | 640 | 590 |
| Modulus of elasticity [MPa] | | 4.1 | 4.2 | 4.2 | 4.2 |

N.m. = not measurable

It can be seen from table 9 that the heat-activatable adhesive of example 17 does not cure without heat activation. However, an activation of one minute at 100° C. is already sufficient to activate the surface-deactivated polyisocyanate such that the mechanical properties after complete curing nearly approach the values attainable with example 17. The mechanical values determined after complete curing demonstrate that the surface-deactivated polyisocyanate is obviously fully activated after an activation of only 5 minutes at 100° C.

Finally, the adhesive of example 17 was applied as described above but without activation. After storing the adhesive under standard climate for two days, a spatula was used to test if the consistency of the adhesive had distinctly changed since application (direct comparison with fresh material). No change was observed.

Thereafter, the adhesive film was heated in a convection oven at 100° C. for 10 minutes, cooled to room temperature without any post-cure and tested for mechanical properties as described above. The following values were obtained:

| Blistering: | None | Elongation at break | 540% |
| Tensile strength: | 6.0 MPa | Modulus of elasticity: | 4.0 MPa |

The fact that the heat-activatable moisture-curing adhesive of example 17 cured completely after short heating indicates that it behaves like a hot-curing adhesive. Apparently, the amount of moisture absorbed by the adhesive during its two-day storage under standard climate from the air by diffusion was already sufficient to crosslink the adhesive after heat activation to a large extent or completely.

The invention claimed is:

1. A curable composition comprising:
    a) at least one blocked amine BA having a blocked, hydrolytically activatable amino group and either at least one additional blocked, hydrolytically activatable amino group or at least one reactive group R selected from the group consisting of a hydroxyl group, mercapto group and a secondary amino group; and
    b) at least one surface-deactivated polyisocyanate DI that is solid at room temperature,
    wherein the blocked amine BA is an aldimine BA2 of a formula (I),

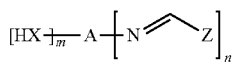

(I)

where
n represents 1 or 2 or 3 or 4, and
m represents 0 or 1,
provided that m+n represents 2 or 3 or 4;
and where
A represents either an m+n-valent hydrocarbon moiety having from 2 to 30 C atoms, or together with $R^7$ represents an (n+2)-valent hydrocarbon moiety having from 3 to 30 C atoms;
X represents O or S or N—$R^6$ or N—$R^7$,
where $R^6$
either represents a monovalent hydrocarbon moiety having from 1 to 20 C atoms,
or a substituent of the formula (II),

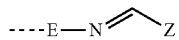

(II)

where
E represents a divalent hydrocarbon moiety having from 2 to 12 C atoms, and
$R^7$ together with A represents an (n+2)-valent hydrocarbon moiety having from 3 to 30 C atoms; and
Z is free from reactive groups R and primary amino groups
and
either represents a moiety $Z^1$ of the formula (III),

(III)

where
Y represents a monovalent hydrocarbon moiety having from 1 to 32 C atoms formed as ether, carbonyl, ester, amido, urea, urethane or tertiary amino groups, and
$R^1$ and $R^2$ either
independently of each other each represent a monovalent hydrocarbon moiety having from 1 to 12 carbon atoms,
or together represent a divalent hydrocarbon moiety having from 4 to 12 carbon atoms,
or represents a moiety $Z^2$,
where $Z^2$ either represents a substituted or unsubstituted aryl or heteroaryl ring having a ring size of from 5 to 8,
or represents

where $R^0$ represents a hydrogen atom or an alkoxy moiety or a substituted or unsubstituted alkenyl or arylalkenyl moiety having at least 6 C atoms.

2. The curable composition according to claim 1, wherein a mean particle diameter of the surface-deactivated polyisocyanate DI ranges from 0.01 to 100 µm.

3. The curable composition according to claim 1, wherein a polyisocyanate forming a basis of the surface-deactivated polyisocyanate DI that is solid at room temperature is selected from the group consisting of: naphthalene-1,5-diisocyanate (NDI), 3,3'-dimethyl-4,4'-diisocyanatodiphenyl (TODI), 1,4-phenylene diisocyanate, the isocyanurate of 1-isocyanato-3,3,5-trimethyl-5-isocyanatomethylcyclohexane, the uretdione of 4,4'-diphenylmethane diisocyanate, the uretdione of 2,4-toluylene diisocyanate and the urea of 2,4-toluylene diisocyanate.

4. The curable composition according to claim 1, wherein the blocked amine BA and the surface-deactivated polyisocyanate DI are present in the curable composition in such an amount that a ratio between the blocked amino groups and isocyanate groups is from 0.1 to 1.1.

5. The curable composition according to claim 1, wherein the aldimine BA2 of formula (I) contains a rest $Z^1$ of the formula (III a')

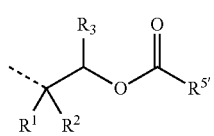

(III a')

where
$R^3$ represents a hydrogen carbon or an alkyl group or a cycloalkyl-group or an arylalkyl group having from 1 to 12 C atoms;
and
$R^{5'}$ either
represents a linear or branched alkyl moiety having from 6 to 30 atoms, or represents a mono- or polyunsaturated linear or branched hydrocarbon moiety having from 6 to 30 C atoms.

6. The curable composition according to claim 1, wherein:
the blocked amine BA is a polymeric blocked amine PBA that is a polymer having at least two blocked, hydrolytically activatable amino groups.

7. A curable composition comprising:
a) at least one blocked amine BA having a blocked, hydrolytically activatable amino group and either at least one additional blocked, hydrolytically activatable amino group or at least one reactive group R selected from the group consisting of a hydroxyl group, mercapto group and a secondary amino group; and
b) at least one surface-deactivated polyisocyanate DI that is solid at room temperature,
wherein:
the blocked amine BA is a polymeric blocked amine PBA2' that is free from isocyanate groups, reactive groups R and primary amino groups and that has aldimino groups of the formula (XII a),

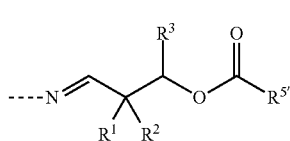

(XII a)

where
$R^1$ and $R^2$ either independently of each other each represent a monovalent hydrocarbon moiety having from 1 to 12 carbon atoms, or together represent a divalent hydrocarbon moiety having from 4 to 12 carbon atoms;
$R^3$ represents a hydrogen carbon or an alkyl group or a cycloalkyl group or an arylalkyl group having from 1 to 12 C atoms; and R⁵' either represents a linear or branched alkyl moiety having from 6 to 30 atoms, or represents a mono- or polyunsaturated linear or branched hydrocarbon moiety having from 6 to 30 C atoms.

8. The curable composition according to claim 1, comprising:
water or a substance generating water in such an amount that a ratio between a number of water molecules and a number of blocked amino groups is more than 0.25, and the composition is hot-curing.

9. The curable composition according to claim 1, wherein:
the blocked amino groups contained in the composition are present as enamino groups and/or ketimino or aldimino groups capable of forming enamines, and the composition is free from water or contains water in such an amount that a ratio of a number of water molecules to a number of blocked amino groups is at most 0.25, and the composition is hot-curing.

10. A curable composition comprising:
a) at least one blocked amine BA having a blocked, hydrolytically activatable amino group and either at least one additional blocked, hydrolytically activatable amino group or at least one reactive group R selected from the group consisting of a hydroxyl group, mercapto group and a secondary amino group; and
b) at least one surface-deactivated polyisocyanate DI that is solid at room temperature,
wherein:
the blocked amino groups contained in the composition are present as oxazolidino groups or aldimino groups not capable of forming enamines, and the composition is free from water or contains water in such an amount that a ratio between a number of water molecules and a number of blocked amino groups is at most 0.1, and the composition contains a polyol P and the composition is heat-activatable.

11. A process for bonding a substrate S1 and a substrate S2 comprising:
i) applying a curable composition according to claim 1 to a substrate S1;
ii) contacting the applied composition with a substrate S2; or
I') applying a curable composition according to claim 1 both to a substrate S1 and a substrate S2;
ii') contacting the applied compositions with each other; and, subsequently,
iii) heating the applied composition by a suitable method to a temperature of from 60° C. to 160° C.;
wherein the substrate S2 is formed of a same or a different material than the substrate S1.

12. A process for bonding a substrate S1 and a substrate S2 comprising:
α) heating a curable composition according to claim 10 by a suitable method to a temperature of from 60° C. to 160° C.; subsequently either
β) applying the composition heated in step a) to a substrate S1;
γ) contacting the applied composition with a substrate S2 within the open time of the composition; or
β') applying the composition heated in step a) to a substrate S1 and to a substrate S2;
γ') contacting the applied composition with each other within an open time of the composition;
wherein a period of several minutes to days or several weeks elapses between heating and applying the composition; and wherein the substrate S2 is formed of the a same or a different material than the substrate S1.

13. The curable composition according to claim 1, configured for application as hot curing adhesive application.

14. The curable composition according to claim 10, configured for application as heat-activatable adhesive, sealant or coating.

15. The curable composition according to claim 1, comprising:
water or a substance generating water.

16. The curable composition according to claim 1, wherein a mean particle diameter of the surface-deactivated polyisocyanate DI ranges from 0.01 to 50 μm.

17. The curable composition according to claim 1, wherein a mean particle diameter of the surface-deactivated polyisocyanate DI ranges from 0.3 to 30 μm.

18. The curable composition according to claim 1, wherein the blocked amine BA and the surface-deactivated polyisocyanate DI are present in the curable composition in such an amount that a ratio between blocked amino groups and isocyanate groups is from 0.2 to 1.1.

19. The curable composition according to claim 1, wherein the blocked amine BA and the surface-deactivated polyisocyanate DI are present in the curable composition in such an amount that a ratio between blocked amino groups and isocyanate groups is from 0.3 to 1.0.

20. The curable composition according to claim 1, where:
A contains at least one hetero atom of either oxygen or tertiary amine nitrogen; and/or
$R^6$ contains at least one carboxylic acid ester, nitrile, nitro, phosphoric acid ester, sulfone or sulfonic acid ester group, and/or where E contains either oxygen or tertiary amine nigrogen; and/or
$R^7$ contains at least one hetero atom of either oxygen or tertiary amine nitrogen; and/or
Y contains at least one hetero atom of either oxygen or nitrogen; and/or
$R^1$ and $R^2$ together are part of a substituted carbocyclic ring having from 5 to 8 atoms.

21. The curable composition according to claim 20, wherein $R^1$ and $R^2$ together are part of a substituted carbocyclic ring having 6 C atoms, and $Z^2$ has a ring size of 6 atoms.

22. The curable composition according to claim 5, wherein:
$R^5$ has from 11 to 30 C atoms, with cyclic proportions, and contains at least one hetero atom of oxygen and is formed as ether, carbonyl or ester groups, or represents a mono- or polyunsaturated linear or branched hydrocarbon moiety having 11 to 30 C atoms.

23. The curable composition according to claim 7, wherein:
$R^1$ and $R^2$ together are part of a substituted carbocyclic ring having from 5-8 atoms; and/or
$R^6$ has from 11 to 30 C atoms, with cyclic proportions, and contains at least one hetero atom of oxygen and is formed as ether, carbonyl or ester groups, or represents a mono- or polyunsaturated linear or branched hydrocarbon moiety having 11 to 30 C atoms.

24. The curable composition according to claim 1, comprising:
water or a substance generating water in such an amount that a ratio between a number of water molecules and a number of blocked amino groups is more than 0.5, and the composition is hot-curing.

25. The process according to claim 11, wherein the heating of the composition is to a temperature of from 80° C. to 140° C.

26. The process according to claim 11, wherein the heating of the composition is to a temperature of from 90° C. to 130° C.

27. The process according to claim 12, wherein the heating of the composition is to a temperature of from 80° C. to 140° C.

28. The process according to claim 12, wherein the heating of the composition is to a temperature of from 90° C. to 130° C.

29. The curable composition according to claim 13, configured for application as an elastic hot curing adhesive for industrial applications.

30. The curable composition according to claim 14, configured for application as heat-activatable adhesive, sealant or coating.

31. The curable composition according to claim 1, where $R^6$ represents a monovalent hydrocarbon moiety having from 1 to 20 C atoms containing at least one carboxylic acid ester, nitrile, nitro, phosphonic acid ester, sulfone or sulfonic acid ester group.

* * * * *